US012190805B2

(12) United States Patent
Zhang et al.

(10) Patent No.: US 12,190,805 B2
(45) Date of Patent: Jan. 7, 2025

(54) DISPLAY PANEL, METHOD FOR DRIVING DISPLAY PANEL, DRIVING CIRCUIT AND DISPLAY DEVICE

(71) Applicant: Xiamen Tianma Display Technology Co., Ltd., Xiamen (CN)

(72) Inventors: Yuheng Zhang, Xiamen (CN); Xiaoting Xing, Xiamen (CN); Xueqi Sun, Xiamen (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 17/983,416

(22) Filed: Nov. 9, 2022

(65) Prior Publication Data

US 2024/0078972 A1 Mar. 7, 2024

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2310/061* (2013.01); *G09G 2320/0233* (2013.01); *G09G 2320/0247* (2013.01); *G09G 2330/021* (2013.01)

(58) Field of Classification Search
CPC ................... G09G 3/3233; G09G 3/32; G09G 2310/061; G09G 2320/0233; G09G 2320/0247; G09G 2330/021; G09G 2300/0814; G09G 2300/0819; G09G 2300/0861; G09G 2300/0866; G09G 2310/08; G09G 2320/045
USPC .......................................................... 345/55
See application file for complete search history.

(56) References Cited

U.S. PATENT DOCUMENTS

2023/0274692 A1* 8/2023 Su ........................... G09G 3/32 345/55

FOREIGN PATENT DOCUMENTS

CN 112150969 A 12/2020
CN 114420032 A 4/2022

* cited by examiner

*Primary Examiner* — Amare Mengistu
*Assistant Examiner* — Gloryvid Figueroa-Gibson
(74) *Attorney, Agent, or Firm* — East IP P.C.

(57) ABSTRACT

The present application discloses a display panel and its driving method, driving circuit and display device. The display panel includes a pixel circuit and a light-emitting element; the pixel circuit includes a first reset module configured to provide a reset signal for the light-emitting element under control of a first control signal; operation modes of the display panel includes a first mode and a second mode, a brightness of the display panel is L1 under the first mode, the brightness of the display panel is L2 under the second mode, and L1<L2; a refresh frequency of the first control signal is F1 under the first mode, the refresh frequency of the first control signal is F2 under the second mode, and F1<F2.

20 Claims, 22 Drawing Sheets

| | | | | | | | | | | | |
|---|---|---|---|---|---|---|---|---|---|---|---|
| Combination 1 | EM (360Hz) | Active5 | Active5 | Active5 | Active5 | Active5 | Active5 | ...... | Active5 | Active5 | Active5 |
| | S1 (360Hz) | Active1 | Active1 | Active1 | Active1 | Active1 | Active1 | ...... | Active1 | Active1 | Active1 |
| | S2/S41/S6(120Hz) | Active2 | | | Active2 | | | ...... | Active2 | | |
| Combination 2 | EM (360Hz) | Active5 | Active5 | Active5 | Active5 | Active5 | Active5 | ...... | Active5 | Active5 | Active5 |
| | S1 (360Hz) | Active1 | Active1 | Active1 | Active1 | Active1 | Active1 | ...... | Active1 | Active1 | Active1 |
| | S2/S41/S6(90Hz) | Active2 | | | Hold | Active2 | | | ...... | Active2 | |
| Combination 3 | EM (360Hz) | Active5 | Active5 | Active5 | Active5 | Active5 | Active5 | ...... | Active5 | Active5 | Active5 |
| | S1 (120Hz) | Active1 | | | Active1 | | | ...... | Active1 | | |
| | S2/S41/S6(120Hz) | Active2 | | | Active2 | | | ...... | Active2 | | |
| Combination 4 | EM (360Hz) | Active5 | Active5 | Active5 | Active5 | Active5 | Active5 | ...... | Active5 | Active5 | Active5 |
| | S1 (120Hz) | Active1 | | | Active1 | | | ...... | Active1 | | |
| | S2/S41/S6(60Hz) | Active2 | | | Hold | | | ...... | Active2 | | |

Fig. 24

DISPLAY PANEL, METHOD FOR DRIVING DISPLAY PANEL, DRIVING CIRCUIT AND DISPLAY DEVICE

CROSS-REFERENCE TO RELATED APPLICATION

This application claims priority to Chinese Patent Application No. 202211084713.1, filed on Sep. 6, 2022, which is hereby incorporated by reference in its entirety.

TECHNICAL FIELD

The present application relates to the field of display technology, and particularly relates to a display panel, a method for driving a display panel, a driving circuit and a display device.

BACKGROUND

A pixel circuit and a light-emitting element are generally disposed in a display panel. A driving transistor in the pixel circuit can generate a drive current according to a data signal received by the driving transistor to drive the light-emitting element to emit light, so that the display panel presents a display image with corresponding brightness.

Since the display panel has different operation modes under different application scenarios, display brightness of the display panel is different under different operation modes. The display panel is vulnerable to a problem of poor display uniformity under a low brightness mode.

SUMMARY

Embodiments of the present application provide a display panel, a method for driving a display panel, a driving circuit and a display device, so as to mitigate the problem of poor display uniformity that the display panel is vulnerable to under the low brightness mode.

In a first aspect, embodiments of the present application provide a display panel including a pixel circuit and a light-emitting element, where the pixel circuit includes a first reset module configured to provide a reset signal for the light-emitting element under control of a first control signal; operation modes of the display panel include a first mode and a second mode, a brightness of the display panel is L1 under the first mode, the brightness of the display panel is L2 under the second mode, and L1<L2; a refresh frequency of the first control signal is F1 under the first mode, the refresh frequency of the first control signal is F2 under the second mode, and F1<F2.

Based on the same inventive concept, in a second aspect, embodiments of the present application provide a method for driving a display panel, where the display panel includes a pixel circuit and a light-emitting element;

the pixel circuit includes a first reset module configured to provide a reset signal for the light-emitting element under control of a first control signal;

operation modes of the display panel includes a first mode and a second mode, a brightness of the display panel is L1 under the first mode, the brightness of the display panel is L2 under the second mode, and L1<L2;

the method for driving the display panel includes:

controlling a refresh frequency of the first control signal to be F1 under the first mode, controlling the refresh frequency of the first control signal under the second mode to be F2, and F1<F2.

Based on the same inventive concept, in a third aspect, embodiments of the present application provide a driving circuit configured to provide a signal for the display panel of the embodiments of the first aspect;

operation modes of the display panel includes a first mode and a second mode, a brightness of the display panel is L1 under the first mode, the brightness of the display panel is L2 under the second mode, and L1<L2;

a refresh frequency of a first control signal is F1 under the first mode, the refresh frequency of the first control signal is F2 under the second mode, and F1<F2.

Based on the same inventive concept, in a fourth aspect, embodiments of the present application provides a display device including a display panel including a pixel circuit and a light-emitting element, where the pixel circuit includes a first reset module configured to provide a reset signal for the light-emitting element under control of a first control signal;

operation modes of the display panel include a first mode and a second mode, a brightness of the display panel is L1 under the first mode, the brightness of the display panel is L2 under the second mode, and L1<L2;

a refresh frequency of the first control signal is F1 under the first mode, the refresh frequency of the first control signal is F2 under the second mode, and F1<F2.

BRIEF DESCRIPTION OF THE DRAWINGS

Other features, objects and advantages of the present application will become more apparent from the detailed description of non-limiting embodiments with reference to the drawings below. The same or similar reference signs refer to the same or similar features, and the drawings are not drawn according to actual scale.

FIG. 24 shows another flow chart of a method for driving a display panel according to an embodiment of the present application.

DETAILED DESCRIPTION

Figure 1:
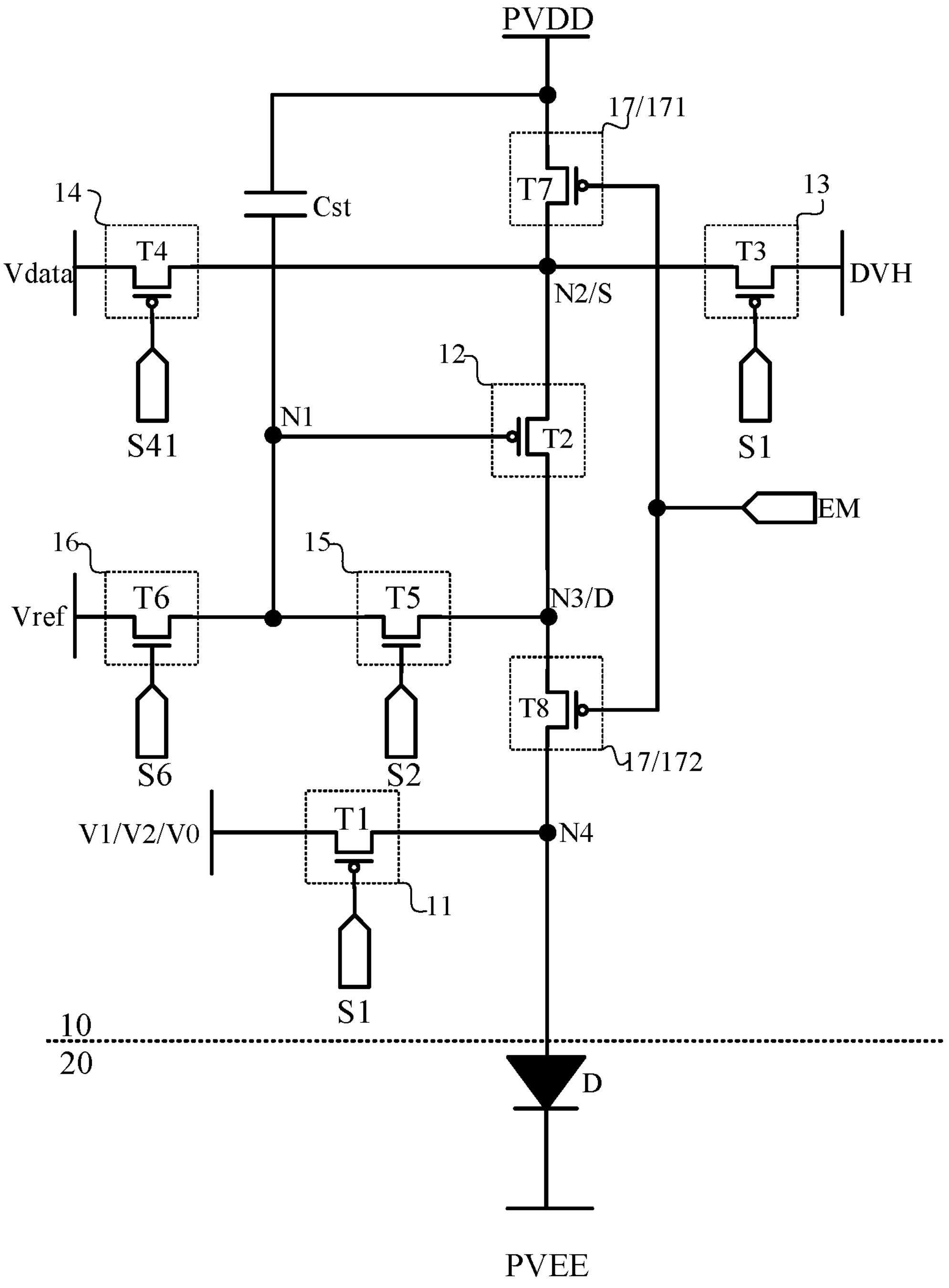
FIG. 1 shows a schematic structural diagram of a pixel circuit of a display panel according to an embodiment of the present application.

Features and exemplary embodiments of various aspects of the present application will be described in detail below. In order to make the objects, technical solutions and advantages of the present application clearer, the present application is further described in detail below with reference to the drawings and specific embodiments. It should be understood that, specific embodiments described herein are merely configured to illustrate the present application, not configured to limit the present application. For those skilled in the art, the present application may be implemented without some of these specific details. The following description of the embodiments is only for providing a better understanding of the present application by illustrating examples of the present application.

It should be noted that, herein, relational terms such as “first” and “second” are used only for distinguishing one entity or operation from another entity or operation, and do not necessarily require or imply any such actual relationship or order between these entities or operations. Moreover, the terms “comprising”, “including”, or any other variation thereof, are intended to encompass a non-exclusive inclusion, such that a process, a method, an article or a device including a series of elements not only includes these elements, but also includes other elements not explicitly listed, or includes elements inherent to the process, the method, the article or the device. Without further limitation, an element preceded by “including . . . ” does not exclude presence of additional similar elements in a process, a method, an article or a device including the element.

It should be understood that, the term “and/or” used herein refers to only an association relationship for describing associated objects, which includes three possible kinds of relationships. For example, “A and/or B” may represent three possible cases including “A existing alone”, “A and B existing simultaneously”, and “B existing alone”. In addition, the character “/” herein generally represents that there is an “or” relationship between the associated objects preceding and succeeding the character “/” respectively.

In embodiments of the present application, the term “electrical connection” may refer to a direct electrical connection between two components, or may refer to an electrical connection between two components via one or more other components.

It will be apparent to those skilled in the art that various modifications and variations can be made to the present application without departing from the gist or scope of the present application. Accordingly, the present application is intended to cover the modifications and variations of the present application that fall within the scope of the appended claims (claimed technical solutions) and their equivalents. It should be noted that, the implementations provided by the embodiments of the present application may be combined with one another without conflict.

Before describing the technical solutions provided by the embodiments of the present application, in order to facilitate the understanding of the embodiments of the present application, the present application first specifically describes the problems existing in the related art.

As described above, under a low brightness mode, the display panel is vulnerable to a problem of poor display uniformity.

In order to solve the above technical problem, the inventors of the present application first conducted research on and analyzed root causes leading to the above technical problem. A specific research and analysis process is described below.

A corresponding reset module can be disposed in a pixel circuit of a display panel. The reset module can provide a reset signal to an anode of a light-emitting element under control of a control signal, so as to reset the anode of the light-emitting element. When the light-emitting element emits light, the anode of the light-emitting element is required to be raised from a reset voltage to a target voltage. The process of being raised from the reset voltage to the target voltage can be understood as a process of charging the anode. The higher a refresh frequency of the control signal corresponding to the reset module is, the more times for charging the anode of the light-emitting element are. However, in contrast to a high brightness mode, a drive current provided by the pixel circuit is relatively small under the low brightness mode, and therefore, it is relatively difficult to charge the anode of the light-emitting element each time under the low brightness mode. Under a condition that a fixed refresh frequency is used by the control signal corresponding to the reset module, the degrees of difficulty in charging the light-emitting element under different modes cannot be given consideration to at the same time, which results in great difficulty in charging the anode of the light-emitting element under the low brightness mode and the display panel is vulnerable to the problem of the poor display uniformity.

In view of the above research findings of the inventors, embodiments of the present application provide a display panel, a method for driving a display panel, a driving circuit and a display device, so as to mitigate the problem of poor display uniformity that the display panel is vulnerable to under the low brightness mode.

Technical concept of embodiments of the present application is that, different refresh frequencies are used to reset the light-emitting element when the display panel has different brightness under different brightness modes, and a relatively low refresh frequency is used to reset the light-emitting element under the low brightness mode; in contrast to the high brightness mode, under the low brightness mode, times for resetting the light-emitting element in a same period of time are fewer, and times for charging the light-emitting element are also fewer in the same period of time, so that overall difficulty in charging the light-emitting element can be reduced to mitigate the problem of poor display uniformity that the display panel is vulnerable to under the low brightness mode.

The above is the core idea of the present application, and based on embodiments of the present application, all other embodiments obtained by a person skilled in the art without any inventive effort belong to the protection scope of the present application. The technical solutions in the embodiments of the present application will be described clearly and completely below with reference to the drawings of the embodiments of the present application.

FIG. 1 shows a schematic structural diagram of a pixel circuit of a display panel according to an embodiment of the present application. As shown in FIG. 1, the display panel may include a pixel circuit 10 and a light-emitting element 20. The pixel circuit 10 includes a first reset module 11. The first reset module 11 may be electrically connected to an anode of the light-emitting element 20 at a node N4. The first reset module 11 may be turned on or turned off under control of a first control signal S1. When the first control signal S1 controls the reset module 11 to be turned on, the first reset module 11 may transmit a reset signal V0 to the anode of the light-emitting element 20 to reset the light-emitting element 20. The light-emitting element 20 includes, but is not limited to, an organic light-emitting diode (OLED). Herein, a voltage of the reset signal V0 may be a negative voltage less than 0 V.

In an example, the first reset module 11 may include a first transistor T1, a gate of the first transistor T1 may receive the first control signal S1, a first terminal of the first transistor T1 may receive the reset signal V0, and a second terminal of the first transistor T1 is electrically connected to the anode of the light-emitting element 20 at the node N4. The first control signal S1 may be a pulse signal, and the first transistor T1 is controlled to be turned on or turned off by a high level or a low level of the pulse signal.

Operation modes of the display panel may include a first mode and a second mode. A brightness of the display panel is L1 under the first mode, the brightness of the display panel is L2 under the second mode, and $L1<L2$. A refresh frequency of the first control signal S1 is F1 under the first mode, the refresh frequency of the first control signal S1 is F2 under the second mode, and $F1<F2$.

The refresh frequency of the first control signal S1 is calculated based on a minimum cycle in which the reset signal V0 is written into the light-emitting element 20. In one refresh cycle of the first control signal S1, the first reset module 11 may be turned on once, and the reset signal V0 may be written into the light-emitting element 20 once, so that the light-emitting element 20 is reset once. It can be understood that, the less the refresh frequency of the first control signal S1 is, in a same period of time, the fewer the times for charging the light-emitting element 20 are, and the fewer the times for charging the anode of the light-emitting element 20 are; conversely, the greater the refresh frequency of the first control signal S1 is, in a same period of time, the more the times for charging the light-emitting element 20 are, and the more the times for charging the anode of the light-emitting element 20 are.

It should be noted that, in some implementations, the display panel further includes a driving circuit configured to provide the first control signal mentioned above and in embodiments below. In other implementations, the first control signal can also be provided by other mechanisms.

As shown in FIG. 1, the pixel circuit 10 may further include a driving module 12. One end of the driving module 12 may receive a data signal, and the other end of the driving module 12 may be electrically connected to the light-emitting element 20. When the light-emitting element 20 enters a light emission stage, the driving module 12 of the pixel circuit may provide a corresponding drive current to the light-emitting element 20 according to the data signal received by the driving module 12, so that corresponding light brightness is presented by the light-emitting element 20, and the light brightness of the light-emitting element 20 may be relevant to magnitude of the drive current provided by the driving module 12.

Under different application scenarios, the display panel may have different display brightness. For example, display brightness of the display panel when the display panel displays a white image may be greater than display brightness of the display panel when the display panel displays a black image, and display brightness presented by the display panel when external ambient light is bright may be greater than display brightness presented by the display panel when external ambient light is dim. In addition, different data signals may be received by the driving module 12 under different brightness modes, so that the drive currents generated by the driving module 12 are different. The drive current generated by the driving module 12 under the low brightness mode is small. When the light-emitting element 20 emits light, the anode of the light-emitting element 20 is required to be raised from the reset voltage to the target voltage, so that the difficulty in charging the anode of the light-emitting element is relatively great. At this time, the different refresh frequencies are used to reset the light-emitting element when the display panel has different brightness under the different brightness modes, and the relatively low refresh frequency is used to reset the light-emitting element under the low brightness mode. In contrast to the high brightness mode, under the low brightness mode, the times for resetting the light-emitting element are fewer in a same period of time, that is, the times for charging the light-emitting element are reduced, so that the overall difficulty in charging the light-emitting element can be reduced to mitigate the problem of poor display uniformity that the display panel is vulnerable to under the low brightness mode.

It should be noted that, the operation modes of the display panel including the first mode and the second mode mentioned in embodiments of the present application does not specifically means there are two operation modes of the display panel, but instead the first mode and the second mode are used to represent different operation modes of the display panel and the display panel has different brightness under the different modes. In embodiments of the present application, the operation modes of the display panel are different under the different application scenarios, so that the display panel has different brightness.

For ease of description, an example in which the operation modes of the display panel include two modes (the first mode and the second mode) is used in the embodiments to give exemplary illustrations on the technical solutions of embodiments of the present application.

When the display panel displays an image, the display panel presents different brightness according to a content of the image displayed by the display panel and/or an environment in which the display panel is positioned. With a relatively great brightness changing range of the display panel which varies from the darkest to the brightest, the drive current corresponding to the light-emitting element vary greatly. The brightness of the display panel may be divided into different brightness ranges from the darkest to the brightest, and the different brightness ranges may correspond to different operation modes of the display panel.

In some optional embodiments, the brightness of the display panel may include a first brightness range and a second brightness range. A brightness value in the first brightness range is less than a brightness value in the second brightness range. The brightness of the display panel may vary in the first brightness range when the operation mode of the display panel is the first mode, and the brightness of the display panel may vary in the second brightness range when the operation mode of the display panel is the second mode.

Under the first mode or the second mode, that is, under a same brightness mode, the refresh frequency of the first control signal may be of a same value in the first brightness range, and the refresh frequency of the first control signal may be of a same value in the second brightness range, and the refresh frequency of the first control signal in the first brightness range is not equal to the refresh frequency of the first control signal in the second brightness range.

When the brightness of the display panel varies in a certain range, the drive current corresponding to the light-emitting element varies in a relatively small range, so that a degree of difficulty in charging the anode of the light-emitting element is similar when the light-emitting element emits light. Under this condition, the refresh frequency of the first control signal may be of a same value in a same brightness range, so that the times for charging the light-emitting element are the same in the same brightness range, so as to improve the display uniformity of the display panel in the same brightness range. However, the drive current corresponding to the light-emitting element may vary greatly in the different brightness ranges; the refresh frequency of the first control signal is of different values, so that the degrees of the difficulty in charging the light-emitting element in the different brightness ranges are adjusted in a targeted way and the degrees of the difficulty in charging the light-emitting element in the different brightness ranges are balanced, and thus, the display uniformity of the display panel in each of the different brightness ranges can be improved and the display quality of the display panel is improved. In addition, when the brightness of the display panel varies in a certain brightness range, the refresh frequency of the first control signal is fixed, which can reduce power consumption generated by the frequent changing of the refresh frequency of the first control signal, that is, low power consumption of the display panel is facilitated.

In some optional embodiments, a difference between a maximum brightness value and a minimum brightness value corresponding to the first brightness range is $\Delta L1$, and a difference between a maximum brightness value and a minimum brightness value corresponding to the second brightness range is $\Delta L2$, and $\Delta L1<\Delta L2$ The brightness of the display panel may be defined by brightness levels of light emitted by the light-emitting element of the display panel. The brightness levels of light emitted by the light-emitting element may be indicated by gray scales. In an example where the number of gray scale bits of the display panel is 8 bit, the gray scales may be divided into 256 gray scales from 0 to 255, and the brightness of the light-emitting element gradually increases from the 0 gray scale to the 255 gray scale. Generally, when the brightness of light emitted by the light-emitting element is relatively low, a slight change in the brightness of the emitted light can be detected by human eyes; and when the brightness of light emitted by the light-emitting element is relatively high, human eyes have relatively low sensitivity to the change in the brightness of the emitted light, and a relatively great change in the brightness can be detected by human eyes. By arranging the brightness changing span ($\Delta L1$) of the relatively low brightness range of the display panel to be less than the brightness changing span ($\Delta L2$) of the relatively high brightness range of the display panel, the refresh frequency of the first control signal can be adjusted finely under the low brightness range, which further mitigates the problem of poor display uniformity that the display panel is vulnerable to under the low brightness mode.

In other words, in other optional embodiments, the operation modes of the display panel may further include a third mode, a brightness of the display panel is L3 under the third mode, and $L2<L3$. The refresh frequency of the first control signal is F5 under the third mode, and $F2<F5$. In addition, $L3-L2>L2-L1$.

Similarly, It should be noted that, the operation modes of the display panel including the first mode, the second mode and the third mode mentioned in embodiments of the present application does not specifically means there are there operation modes of the display panel, but instead the first mode, the second mode and the third mode are used to represent different operation modes of the display panel and the display panel has different brightness under the different modes.

As the brightness of the display panel decreases under different operation modes, the refresh frequency of the first control signal also tends to decrease. When the refresh frequency of the first control signal is relatively high, the brightness range of the display panel to which the refresh frequency of the first control signal is applicable is relatively wide. When the refresh frequency of the first control signal is relatively low, the brightness range of the display panel to which the refresh frequency of the first control signal is applicable is relatively narrow. Therefore, the refresh frequency of the first control signal can be adjusted finely in the low brightness range, which further mitigates the problem of poor display uniformity that the display panel is vulnerable to under the low brightness mode.

In some optional embodiments, different regions of the display area of the display panel may be controlled per region. For example, the display area of the display panel may be divided into multiple sub-display regions. The refresh frequency of the first control signal may be of a same value at a same sub-display region, and the refresh frequency of the first control signal may be of different values at different sub-display regions. As such, according to actual requirements of each sub-display region, the refresh frequency of the first control signal can be adjusted at each sub-display region in a targeted way, which ensures that the to brightness of the display panel can have high display uniformity at each sub-display region.

Figure 2:
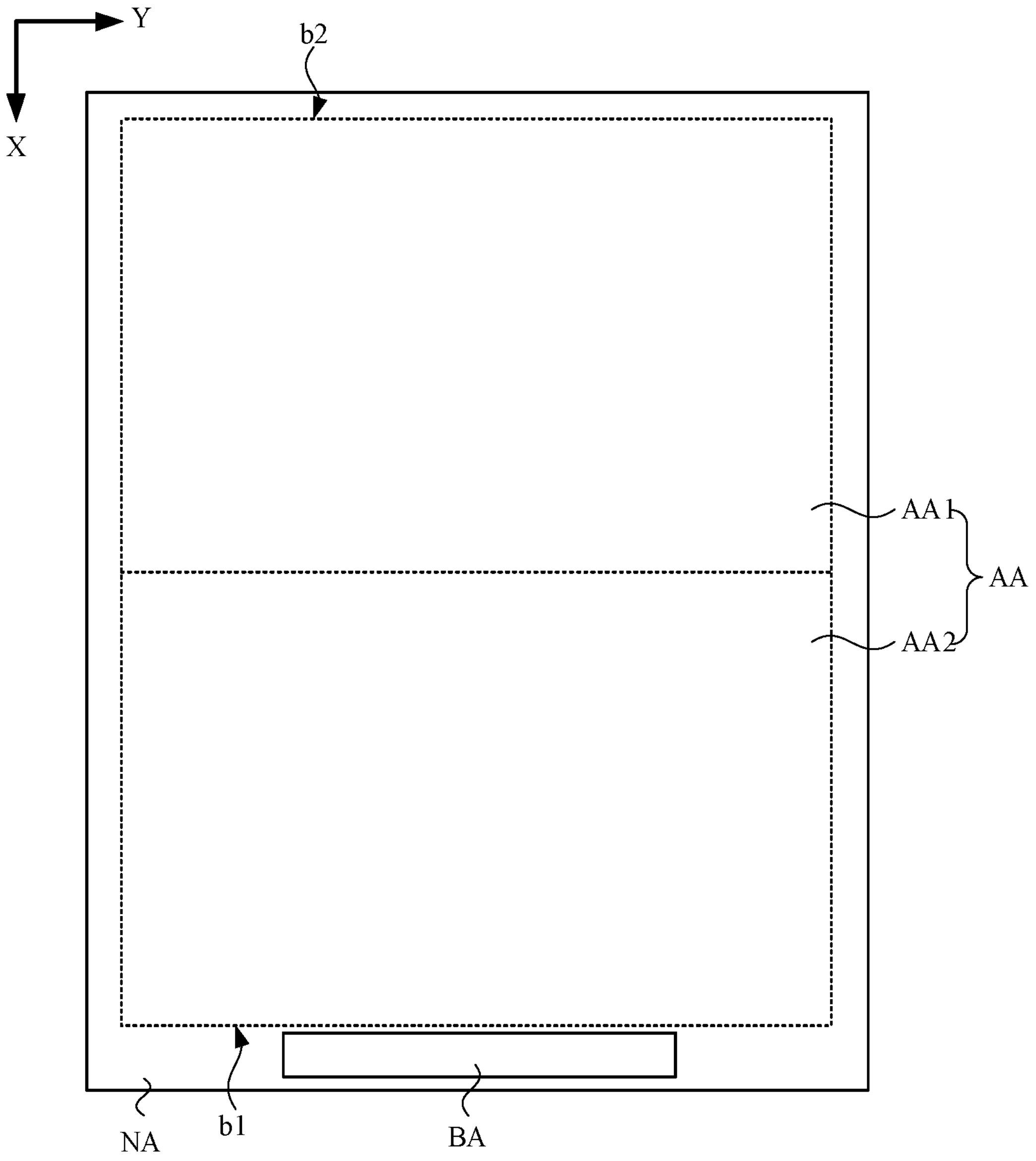
FIG. 2 shows a schematic diagram of a regional division of a display panel according to an embodiment of the present application.

FIG. 2 shows a schematic diagram of a regional division of the display panel according to an embodiment of the present application. As an example, as shown in FIG. 2, a display area AA of the display panel may at least include a first sub-display region AA1 and a second sub-display region AA2. Under the first mode or the second mode, that is, under a same mode, the refresh frequency of the first control signal is of a same value at the first sub-display region AA1, the refresh frequency of the first control signal is of a same value at the second sub-display region AA2, and the refresh frequency of the first control signal at the first sub-display region AA1 is not equal to the refresh frequency of the first control signal at the second sub-display region AA2.

In this way, the display area of the display panel can be controlled per region, and according to the actual requirements of the first sub-display region and the second sub-display region, the refresh frequency of the first control signal can be adjusted at the first sub-display region and the second sub-display region in a targeted way, which ensures that the brightness of the display panel can have high display uniformity at each of the first sub-display region and the second sub-display region.

In some optional embodiments, with further reference to FIG. 2, the display area of the display panel may include a first edge b1 and a second edge b2 opposite to each other along a first direction X. The display panel may further include a non-display area NA at least partially surrounding the display area AA. The non-display area NA may include a bonding area BA. The second edge b2 is positioned on a side of the first edge b1 away from the bonding area BA. The bonding area BA may include a bonding terminal (not shown in the figure). The bonding terminal may be electrically connected to a driving chip. In addition, the bonding terminal may be connected to pixel circuits in the display area AA by signal wiring (not shown in the figure). In this way, signals outputted by the driving chip may be transmitted to respective pixel circuits in the display area AA through the bonding terminals and the signal wiring. For example, the signal wiring may be used to transmit a first power supply voltage PVDD shown in FIG. 1.

The signal wiring may extend along the first direction X. Along the first direction X, as a distance from the bonding area BA increases, IR drop of a signal on the signal wiring becomes greater and greater, which results in a brightness difference between brightness of a display region away from the bonding area BA and brightness of a display region close to the bonding area BA, which is specifically embodied in that the brightness of the display region away from the bonding area BA is lower than the brightness of the display region close to the bonding area BA, and the display region away from the bonding area BA is vulnerable to a problem of display non-uniformity (Mura).

In order to give consideration to display uniformity of display regions at different positions at the same time, as shown in FIG. 2, along the first direction X, the first sub-display region AA1 is positioned on a side of the second sub-display region AA2 away from the first edge b1. Under the first mode or the second mode, the refresh frequency of the first control signal is F6 at the first sub-display region AA1, the refresh frequency of the first control signal is F7 at the second sub-display region AA2, and F6<F7.

Figure 3:
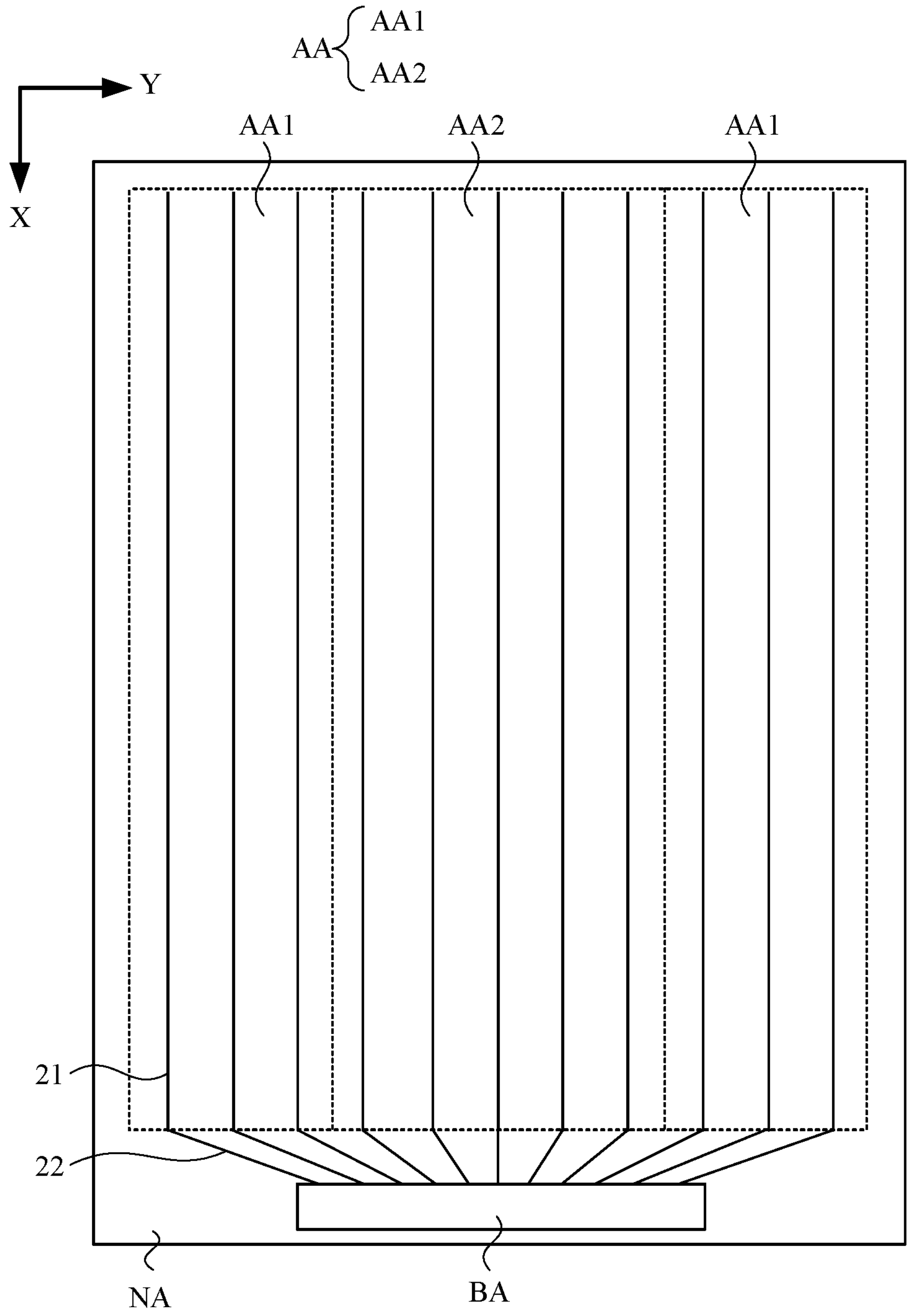
FIG. 3 shows another schematic diagram of a regional division of a display panel according to an embodiment of the present application.

FIG. 3 shows another schematic diagram of regional division of a display panel according to an embodiment of the present application. In other optional embodiments, as shown in FIG. 3, multiple data lines 21 may be disposed in a display area AA of the display panel. A data line 21 may extend along a first direction X, and the multiple data lines 21 may be arranged along a second direction Y. The first direction X intersects the second direction Y. The data line 21 may be connected to the pixel circuit in the display area AA and used to transmit a data signal required by the pixel circuit. The display panel may further include a non-display area NA at least partially surrounding the display area AA. The non-display area NA may include a bonding area BA positioned on a side of the display area AA along the first direction X. The bonding area BA may include a bonding terminal (not shown in the figure). The bonding terminal may be electrically connected to a driving chip. In an example, multiple fan-out lines 22 may be further disposed in the non-display area NA of the display panel, and the fan-out line 22 may be connected between the data line 21 and the bonding terminal, so that data signals outputted by the driving chip may be transmitted to respective pixel circuits in the display area AA through the bonding terminal, the fan-out line 22 and the data line.

Optionally, the multiple fan-out lines 22 may be arranged along the second direction Y. Along the second direction Y, fan-out lines 22 on a left side and a right side may be correspondingly connected to data lines 21 on a left side and a right side, and fan-out line 22 in the middle may be correspondingly connected to data lines 21 in the middle. With further reference to FIG. 3, along the second direction Y, wiring lengths of the fan-out lines 22 on the left side and the right side may be greater than wiring lengths of the fan-out lines 22 positioned in the middle, so that IR drops corresponding to the display regions on the left side and the right side is relatively great, and therefore, a possibility that the data signals in the display regions on the left side and the right side are not charged sufficiently is relatively great, so that the problem of display non-uniformity is likely to occur.

In order to give consideration to the display uniformity of the display regions at different positions at the same time, as shown in FIG. 3, along the second direction Y, a second sub-display region AA2 may be positioned between two adjacent first sub-display regions AA1. Under the first mode or the second mode, the refresh frequency of the first control signal is F8 at the first sub-display region AA1, the refresh frequency of the first control signal is F9 at the second sub-display region AA2, and F8<F9.

In embodiments shown in FIG. 2 and FIG. 3, the relatively low refresh frequency is used to reset the light-emitting element at the sub-display region with a relatively great IR drop (the first sub-display region AA1). In contrast to the sub-display region with a relatively small IR drop (the second sub-display region AA2), the times for resetting the light-emitting element in the sub-display region with the relatively great IR drop are fewer in a same period of time, and the times for charging the light-emitting element are also fewer in the same period of time, so that the overall difficulty in charging the light-emitting element can be reduced to mitigate the problem of display non-uniformity that the sub-display region with a relatively great IR drop is vulnerable to.

Figure 4:
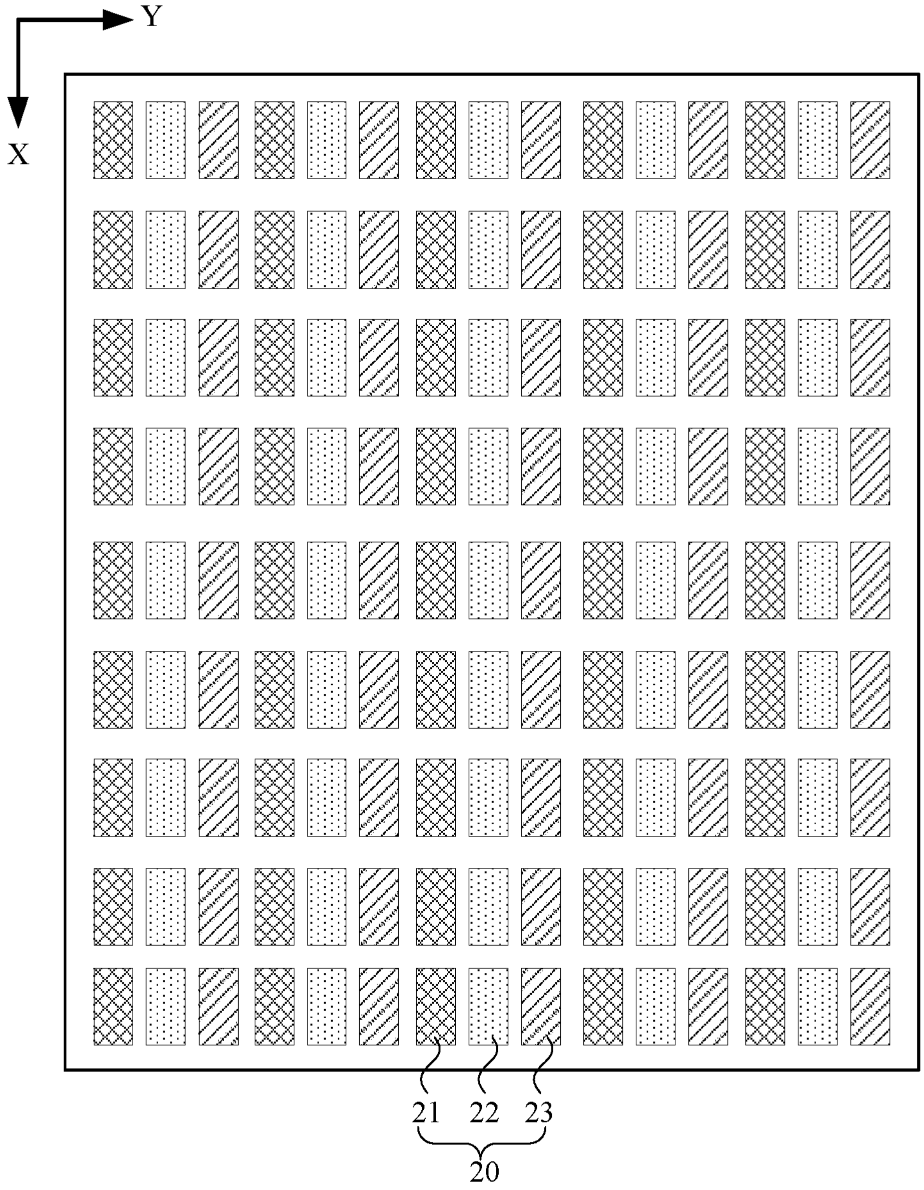
FIG. 4 shows a schematic diagram of distribution of a light-emitting element of a display panel according to an embodiment of the present application.
Figure 5:
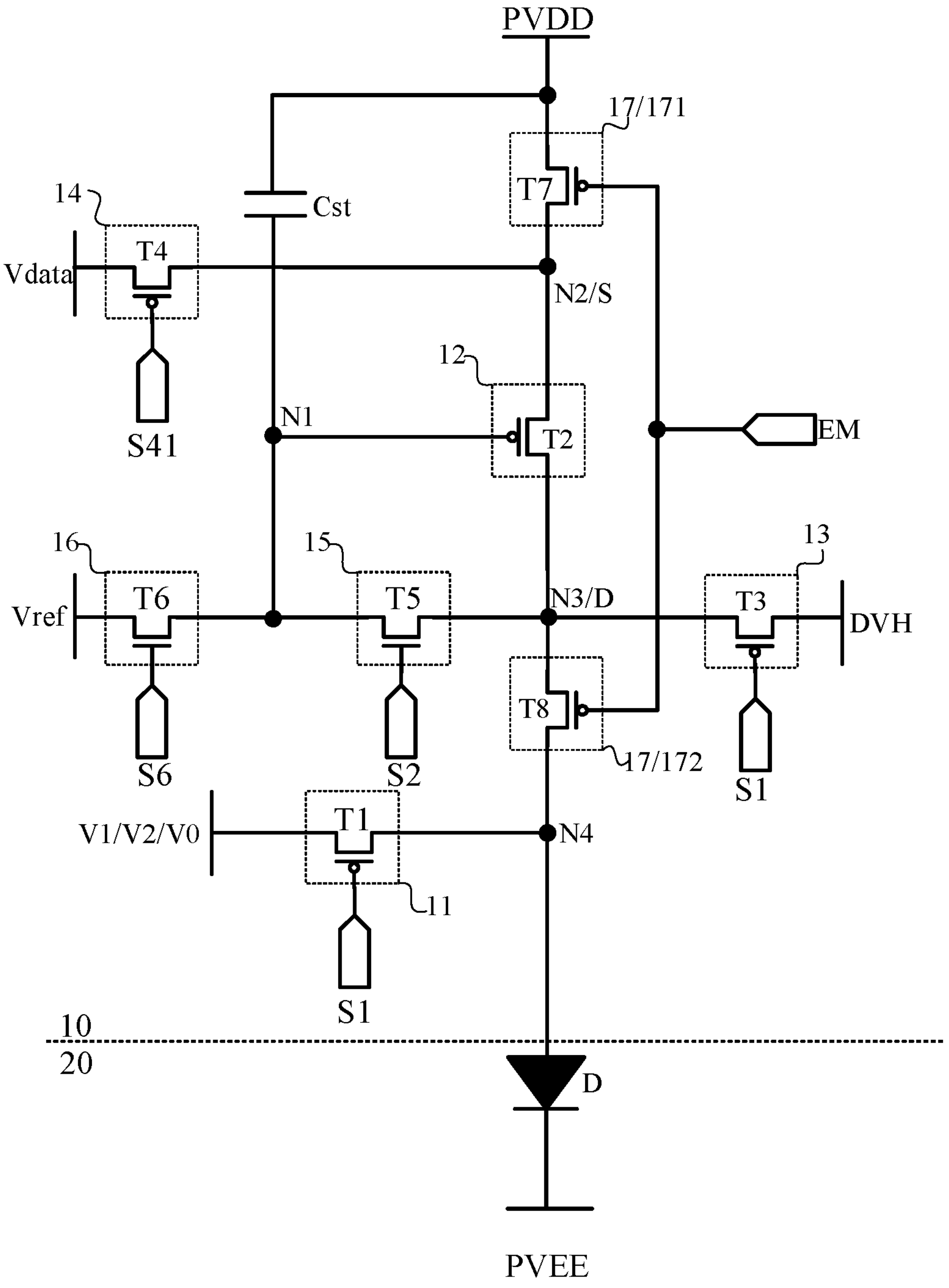
FIG. 5 shows another schematic structural diagram of a pixel circuit of a display panel according to an embodiment of the present application.
Figure 6:
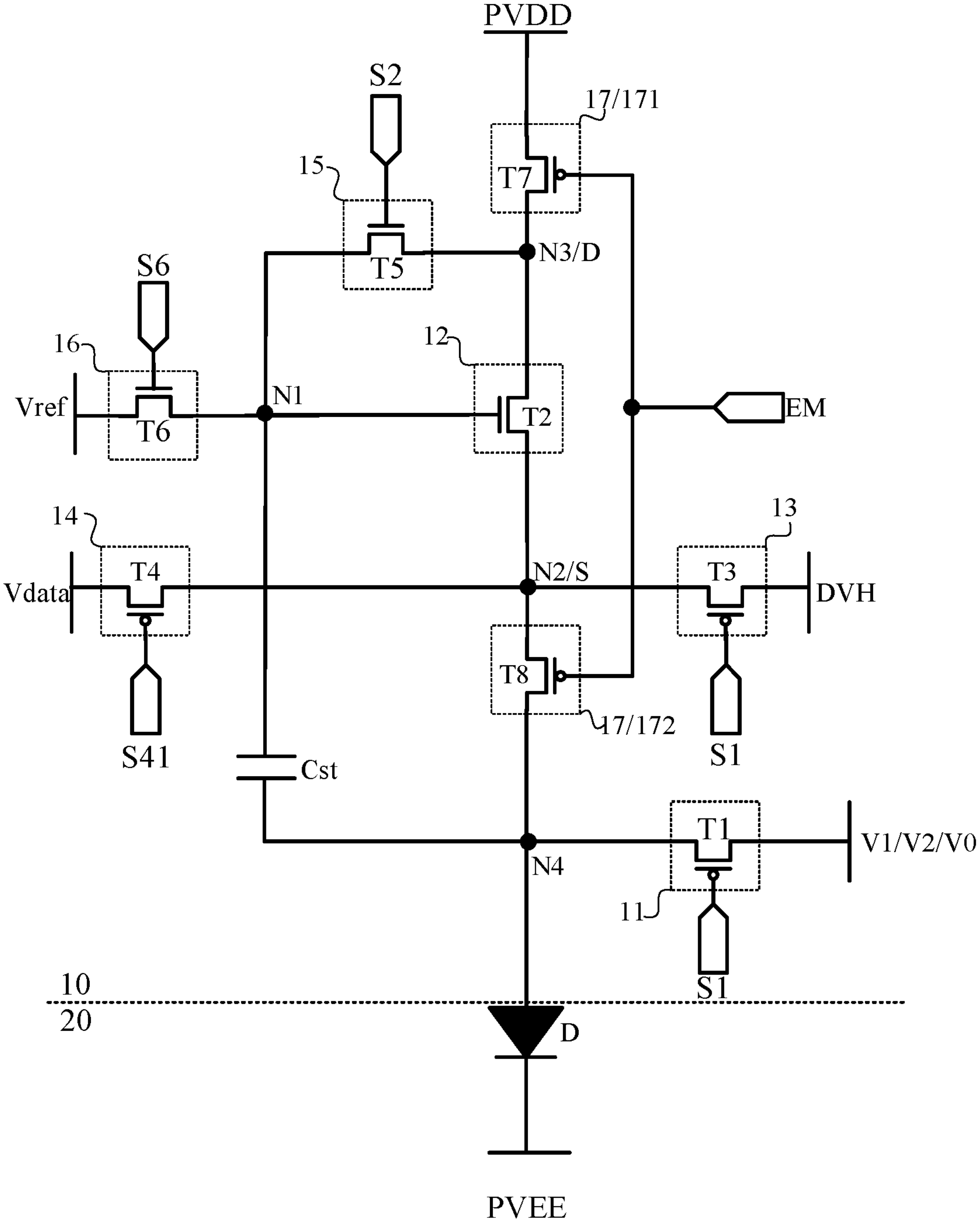
FIG. 6 shows yet another schematic structural diagram of a pixel circuit of a display panel according to an embodiment of the present application.
Figure 7:
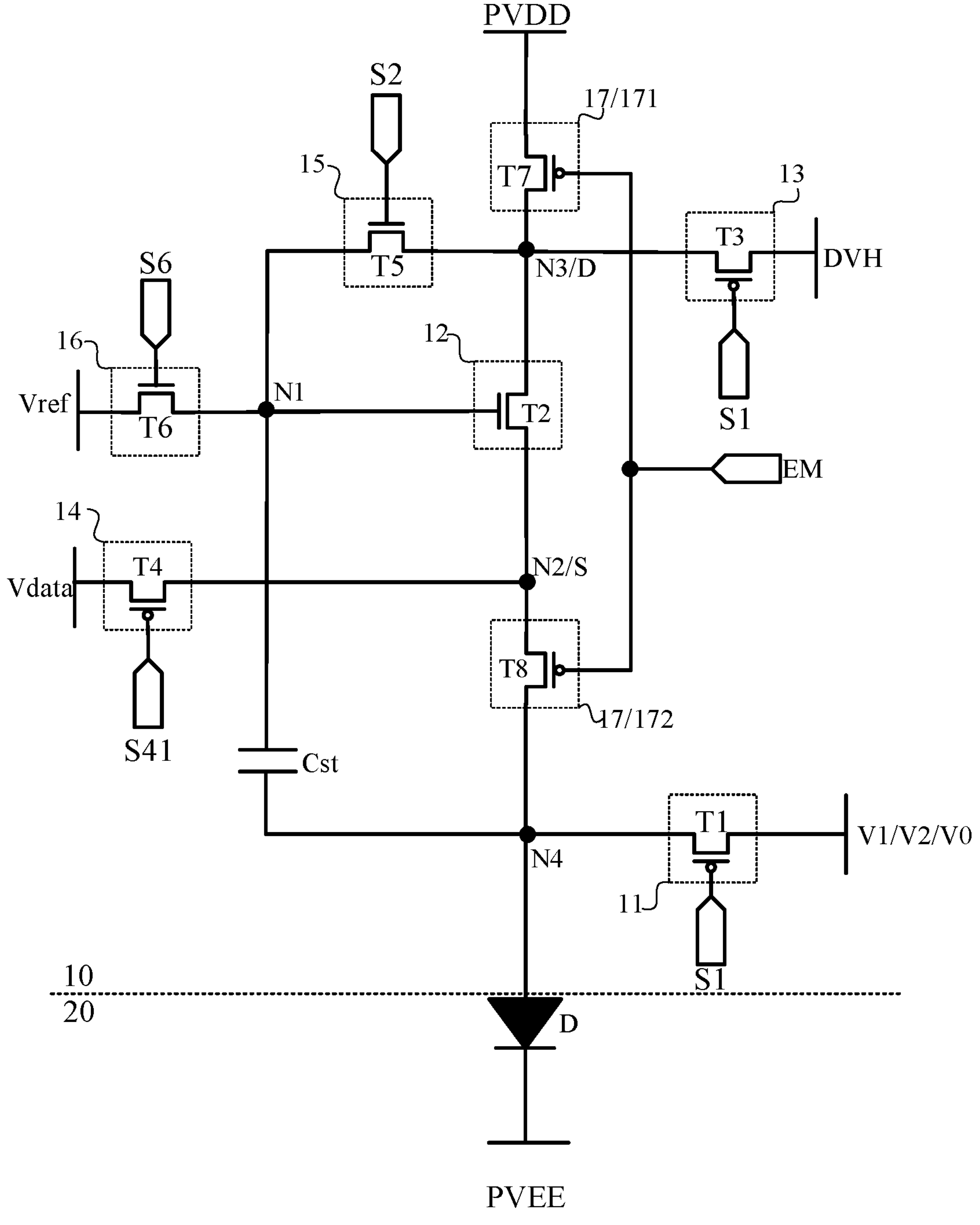
FIG. 7 shows yet another schematic structural diagram of a pixel circuit of a display panel according to an embodiment of the present application.

FIG. 4 shows a schematic diagram of light-emitting element distribution of a display panel according to an embodiment of the present application. In some optional embodiments, as shown in FIG. 4, the light-emitting element 20 of the display panel may include multiple light-emitting elements emitting different colors of light. For example, the light-emitting element 20 may include a first light-emitting element 21 and a second light-emitting element 22 emitting light of a different color from the first light-emitting element 21.

Under the first mode or the second mode, that is, under a same mode, the refresh frequency of the first control signal corresponding to the first light-emitting element 21 is F10, the refresh frequency of the first control signal corresponding to the second light-emitting element 22 is F11, and F10≠F11.

Light emission efficiency of the light-emitting elements emitting light of different colors is different. The refresh frequency of the first control signal corresponding to different light-emitting elements can be adjusted in a targeted way according to the actual requirements of the light-emitting elements emitting light of different colors, which ensures that each of different light-emitting elements of the display panel can have high display uniformity.

In an example, the light-emitting element 20 of the display panel may further include a third light-emitting element 23. The first light-emitting element 21, the second light-emitting element 22 and the third light-emitting element 23 may emit light of colors different from one another. Under a same mode, the refresh frequency of the first control signal corresponding to the third light-emitting element 22 may be different from each of F10 and F11, or the refresh frequency of the first control signal corresponding to the third light-emitting element 22 may be the same as one of F10 and F11.

As an example, the first light-emitting element 21 may emit red light, the second light-emitting element 22 may emit green light, and the third light-emitting element 23 may emit blue light. Light emission efficiency of the third light-emitting element 23 is the highest, light emission efficiency of the first light-emitting element 21 is the second highest, and light emission efficiency of the second light-emitting element 22 is the lowest.

Under a condition that brightness to be displayed by the first light-emitting element 21, the second light-emitting element 22, and the third light-emitting element 23 is the same, since the light emission efficiency of the three light-emitting elements is different, drive currents corresponding to the three light-emitting elements are different. Specifically, the drive current corresponding to the third light-emitting element 23 is the greatest, the drive current corresponding to the first light-emitting element 21 is the second greatest, and the drive current corresponding to the second light-emitting element 22 is the smallest. The less the drive current of the light-emitting element is, the more likely the problem of display non-uniformity is to occur. At this time, the refresh frequency of the first control signal corresponding to the third light-emitting element 23 may be the greatest, the refresh frequency of the first control signal corresponding to the first light-emitting element 21 may be the second greatest, and the refresh frequency of the first control signal corresponding to the second light-emitting element 22 may be the smallest.

Under a condition that the drive currents corresponding to the first light-emitting element 21, the second light-emitting element 22, and the third light-emitting element 23 are the same, since the light emission efficiency of the three light-emitting elements is different, the brightness corresponding to the three light-emitting elements is different. Specifically, the brightness corresponding to the second light-emitting element 22 is the highest, the brightness corresponding to the first light-emitting element 21 is the second highest, and the brightness corresponding to the third light-emitting element 23 is the lowest. The lower the brightness of the light-emitting element is, the more likely the problem of display non-uniformity is to occur. At this time, the refresh frequency of the first control signal corresponding to the second light-emitting element 22 may be the greatest, the refresh frequency of the first control signal corresponding to the first light-emitting element 21 may be the second greatest, and the refresh frequency of the first control signal corresponding to the third light-emitting element 23 may be the smallest.

In some optional embodiments, dimming manners of the display panel may include a power modulation dimming manner and a pulse width modulation dimming manner. The power modulation dimming manner may be referred to as DC dimming and the pulse width modulation dimming manner may be referred to PWM dimming. Brightness adjustment by the pulse width modulation dimming manner means that a data voltage is kept unchanged and desired target brightness is achieved by adjusting a duty ratio. Brightness adjustment by the power modulation dimming manner means that the duty ratio is kept unchanged and the desired target brightness is achieved by adjusting the data voltage.

The refresh frequency of the first control signal is F12 under the power modulation dimming manner, the refresh frequency of the first control signal is F13 under the pulse width modulation dimming manner, and F12>F13. The power modulation dimming manner may be used under the high brightness mode, and the pulse width modulation dimming manner may be used under the low brightness mode. For example, the power modulation dimming manner may be used by the display panel under the second mode, and the pulse width modulation dimming manner may be used by the display panel under the first mode. At this time, different refresh frequencies are used by the display panel to reset the light-emitting element under different dimming manners, and under a condition that the low brightness mode corresponds to the pulse width modulation dimming manner, a relatively low refresh frequency is used to reset the light-emitting element. In contrast to the power modulation dimming manner corresponding to the high brightness mode, the times for resetting the light-emitting element by the pulse width modulation dimming manner are fewer in the same period of time and the times for charging the light-emitting element are also fewer in the same period of time, so that the overall difficulty in charging the light-emitting element can be reduced to mitigate the problem of poor display uniformity that the display panel is vulnerable to under the low brightness mode.

A driving transistor may be disposed in the pixel circuit to provide the drive current for a current-type light-emitting element to control the light-emitting element to emit light. However, since the driving transistor of the pixel circuit may operate under a non-saturated state, when the driving transistor is turned on, for a PMOS-type driving transistor, there may be a condition where gate potential is higher than drain potential, and for a NMOS-type driving transistor, there may be a condition where gate potential is lower than drain potential. Maintaining these conditions for a long period of time results in polarization of ions inside the driving transistor, so that a built-in electric field may be formed inside the driving transistor, which results in a continuous threshold voltage deviation of the driving transistor. In some optional embodiments, as shown in FIG. 1, FIG. 5, FIG. 6, and FIG. 7, the pixel circuit 10 may further include a driving module 12 and a bias adjustment module 13. The driving module 12 is configured to provide a drive current for the light-emitting element 20, and the driving module 12 includes a driving transistor T2. The bias adjustment module 13 is configured to provide a bias adjustment signal DVH for a first terminal or a second terminal of the driving transistor T2 under control of the first control signal S1.

In embodiments of the present application, the bias adjustment module 13 provides the bias adjustment signal DVH to the first terminal or the second terminal of the driving transistor T2. As such, a voltage difference between a gate of the driving transistor T2 and the first terminal of the driving transistor T2 or the voltage difference between the gate of the driving transistor T2 and the second terminal of the driving transistor T2 can be adjusted, so that the threshold voltage deviation of the driving transistor T2 can be alleviated or offset, a bias state of the driving transistor T2 can be adjusted, and the display uniformity can be further improved. The control signals received by the first reset module 11 and the bias adjustment module 13 are the same, so that one signal can be used to control two modules at the same time, which helps to reduce costs.

The bias adjustment module 13 may include a third transistor T3. A gate of the third transistor T3 receives the first control signal S1, a first terminal of the third transistor T3 receives the bias adjustment signal DVH, and a second terminal of the third transistor T3 is electrically connected to the first terminal or the second terminal of the driving transistor T2. In an example, transistors of the first transistor T1 and the third transistor T3 may be of a same type, for example, both of the first transistor T1 and the third transistor T3 are PMOS-type transistors, or both of the first transistor T1 and the third transistor T3 are NMOS-type transistors. In the drawings of the present application, both of the first transistor T1 and the third transistor T3 are shown as PMOS-type transistors for illustration, which is not used to limit the present application.

Under a condition that the transistors included in the first reset module 11 and the bias adjustment module 13 are of a same type, since the gate of the first transistor T1 and the gate of the third transistor T3 receive a same control signal (the first control signal S1 is received by both T1 and T3), the first transistor T1 and the third transistor T3 are turned on or turned off at the same time.

It should be noted that, when the first terminal of the driving transistor T2 is a source of the driving transistor T2, a second terminal of the driving transistor T2 is a drain of the driving transistor T2, and when the second terminal of the driving transistor T2 is the source of the driving transistor T2, the first terminal of the driving transistor T2 is the drain of the driving transistor T2. A situation is shown as an example in FIG. 1 and FIG. 6 where the bias adjustment module 13 is electrically connected to a source S of the driving transistor T2 at a node N2 to provide a bias adjustment signal to the source of the driving transistor T2, so that a voltage difference between the gate of the driving transistor T2 and the source of the driving transistor T2 and the voltage difference between the source of the driving transistor T2 and the drain of the driving transistor T2 are adjusted. A situation is shown as an example in FIG. 5 and FIG. 7 where the bias adjustment module 13 is further electrically connected to a drain D of the driving transistor T2 at a node N3 to provide the bias adjustment signal to the drain of the driving transistor T2, so that the voltage difference between the gate of the driving transistor T2 and the drain of the driving transistor T2 and the voltage difference between the source of the driving transistor T2 and the drain of the driving transistor T2 are adjusted.

In some optional embodiments, as shown in any one of FIG. 1, FIG. 5, FIG. 6 and FIG. 7, the pixel circuit 10 may further include a data writing module 14 and a threshold compensating module 15. The data writing module 14 is configured to transmit a data signal Vdata. The threshold compensating module 15 is configured to write the data signal Vdata into the driving module 12 and compensate the threshold voltage of the driving module 12 under control of the second control signal S2. Under the first mode or the second mode, the refresh frequency of the second control signal S2 is less than or equal to refresh frequency of the first control signal S1.

In an example, as shown in FIG. 1, one end of the data writing module 14 may receive the data signal Vdata and the other end of the data writing module 14 may be electrically connected to the source of the driving transistor T2 at the node N2. When the data writing module 14 is turned on, the data writing module 14 may write the data signal Vdata into the source of the driving transistor T2. When the threshold compensating module 15 is turned on, the data signal Vdata is transmitted from the source of the driving transistor T2 to the drain of the driving transistor T2 and then transmitted to the gate of the driving transistor T2 via the threshold compensating module 15, and the threshold compensating module 15 compensates the threshold voltage of the driving transistor T2, so that the driving transistor T2 can provide the corresponding drive current according to the data signal Vdata.

The data writing module 14 may include a fourth transistor T4. A gate of the fourth transistor T4 may receive a control signal 541, a first terminal of the fourth transistor T4 receives the data signal Vdata, and a second terminal of the fourth transistor T4 is electrically connected to the source of the driving transistor T2. The threshold compensating module 15 may include a fifth transistor T5. A gate of the fifth transistor T5 may receive the second control signal S2. A first terminal of the fifth transistor T5 is electrically connected to the drain of the driving transistor T2. A second terminal of the fifth transistor T5 is electrically connected to the gate of the driving transistor T2.

The refresh frequency of the second control signal S2 is calculated based on the minimum cycle in which the data signal Vdata is written into the gate of the driving transistor T2. In one refresh cycle of the second control signal S2, the threshold compensating module 15 may be turned on at least once, so that the data signal Vdata can be written into the gate of the driving transistor T2 once. It can be understood that, the less the refresh frequency of the second control signal S2 is, the fewer the times that the driving transistor T2 is refreshed by the data signal Vdata in the same period of time are; conversely, the greater the refresh frequency of the second control signal S2 is, the more the times that the driving transistor T2 is refreshed by the data signal Vdata in the same period of time are.

In an example, the pixel circuit 10 may further include a storage capacitor Cst. One end of the storage capacitor Cst is electrically connected to a positive first power supply signal PVDD, and the other end of the storage capacitor Cst is electrically connected to the gate of the driving transistor T2 at a node N1. The storage capacitor Cst is configured to store a gate voltage of the driving transistor T2 to ensure accuracy of the gate voltage of the driving transistor T2.

A process of writing the data signal Vdata into the gate of the driving transistor T2 can be understood as a process of charging the storage capacitor Cst, which results in power consumption. In the same period of time, the more the times that the gate of the driving transistor T2 is refreshed by the data signal Vdata are, the greater the power consumption is, and the fewer the times that the gate of the driving transistor T2 is refreshed by the data signal Vdata are, the less the corresponding power consumption is. In embodiments of the present application, the refresh frequency of the second control signal S2 is less than or equal to the refresh frequency of the first control signal S1, as such, in the same period of time, the times that the gate of the driving transistor T2 is refreshed by the data signal Vdata are fewer or equal to the times that the light-emitting element 20 is reset, so that it is avoided that the gate of the driving transistor T2 is refreshed by the data signal Vdata for many times, thereby reducing the power consumption to a certain extent.

In an example, a refresh frequency of the second control signal S2 may be a fixed frequency, and the refresh frequency of the second control signal S2 may not vary as the display mode varies. For example, under the first mode, the refresh frequency of the second control signal S2 may be equal to the refresh frequency of the first control signal S1; and under the second mode, the refresh frequency of the second control signal S2 may be less than the refresh frequency of the first control signal S1.

In an example, the data writing module 14 is turned on or turned off under control of the control signal S41. The refresh frequency of the control signal S41 may be the same as the refresh frequency of the second control signal S2. The refresh frequency of the control signal S41 is calculated based on the minimum cycle in which the data signal Vdata is written into the source of the driving transistor T2; and in one refresh cycle of the control signal S41, the data writing module 14 may be turned on once, so that the data signal Vdata may be written into the source of the driving transistor T2 once.

Through research, the inventors of the present application have found that, since both of the bias adjustment module 13 and a first reset control 11 are controlled by the first control signal S1, and the refresh frequency of the first control signal S1 is different under different brightness modes, the writing of the bias adjustment signal DVH will be affected, and thus affecting bias adjustment effect on the driving transistor T2, so that a flickering screen problem is likely to occur.

In order to solve the above technical problem, the inventors of the present application conducted research on and analyzed root causes leading to the above technical problem, and found that in a display process a unit extension time needs to be determined according to the refresh frequency of the second control signal S2, and the refresh frequency of the second control signal S2 needs to be associated with the refresh frequency of the first control signal S1, so that a problem of flickering screen can be mitigated.

Specifically, when the refresh frequency of the second control signal S2 and the refresh frequency of the first control signal S1 comply with relational expressions (1) and (2) below, the problem of flickering screen can be mitigated.

$$F3=F1/n1 \quad (1)$$

$$F4=F2/n2 \quad (2)$$

F1 represents the refresh frequency of the first control signal S1 under the first mode, F2 represents the refresh frequency of the first control signal S1 under the second mode, F3 represents the refresh frequency of the second control signal S2 under the first mode, F4 represents the refresh frequency of the second control signal S2 under the second mode, n1 is a natural number greater than or equal to F1/f, n2 is a natural number greater than or equal to F2/f, and f is a maximum refresh frequency of the second control signal S2.

The maximum refresh frequency of the second control signal S2 may be set according to the actual requirements. For example, the maximum refresh frequency of the second control signal S2 may be 60 HZ, 90 HZ, 120 HZ, 144 HZ, 165 HZ, or the like. Of course, these are merely some examples and are not used to limit the present application.

The above relational expressions (1) and (2) may be summarized as the refresh frequency of the second control signal=the refresh frequency of the first control signal/N, N is greater than or equal to the refresh frequency of the first control signal/f, and N is a natural number.

In an example, n2≥n1. As such, the greater the refresh frequency of the first control signal S1 is, the greater the number of selectable refresh frequencies of the second control signal S2 is. Reference is made to Table 1 below for a more direct understanding of the number of the selectable refresh frequencies of the second control signal S2.

TABLE 1

| Refresh frequency of S1 | Frequency variation range of S2 | Rule for selecting refresh frequency of S2 |
|---|---|---|
| 360 Hz | 120 Hz, 90 Hz, 72 Hz, 60 Hz . . . 1 Hz | 360/N N = 3, 4, 5 . . . |
| 240 Hz | 120 Hz, 80 Hz, 60 Hz . . . 1 Hz | 240/N N = 2, 3, 4 . . . |
| 120 Hz | 120 Hz, 60 Hz, 30 Hz . . . 1 Hz | 120/N N = 1, 2, 3 . . . |

Table 1 gives an example where the refresh frequency of the first control signal S1 may be 360 HZ, 240 HZ or 120 HZ, and in an example where the maximum refresh frequency of the second control signal S2 is 120 HZ, when the refresh frequency of the first control signal S1 may be 360 HZ, the refresh frequency of the second control signal S2 may be selected from 120 Hz, 90 Hz, 72 Hz, 60 Hz . . . 1 Hz. When the refresh frequency of the first control signal S1 may be 240 HZ, the refresh frequency of the second control signal S2 may be selected from 120 Hz, 80 Hz, 60 Hz . . . 1 Hz. When the refresh frequency of the first control signal S1 may be 120 HZ, the refresh frequency of the second control signal S2 may be selected from 120 Hz, 60 Hz, 30 Hz . . . 1 Hz.

The greater the refresh frequency of the first control signal S1 is, the greater the number of selectable refresh frequencies of the second control signal S2 is, the greater the frequency variation range of the second control signal S2 is, and the higher the frequency variation precision of the second control signal S2 is. For example, under the high brightness mode, the refresh frequency of the first control signal S1 is relatively great, so that the refresh frequency of the second control signal S2 may be selected from a relatively great frequency variation range, and the refresh frequency of the second control signal S2 may be set to be relatively small under a low power consumption requirement to ensure a desired power consumption.

In some optional embodiments, as shown in any one of FIG. 8 to FIG. 11, the control signal of the bias adjustment module 13 and the first control signal S1 of the first reset module 11 may also be arranged to be independently from each other, and thus avoiding that the frequency variation of the first control signal S1 affects the writing of the bias adjustment signal DVH.

Specifically, the pixel circuit 10 may further include a driving module 12 and the bias adjustment module 13. The driving module 12 is configured to provide the drive current for the light-emitting element 20, and the driving module 12 includes a driving transistor T2. The bias adjustment module 13 is configured to provide the bias adjustment signal DVH for the first terminal or the second terminal of the driving transistor T2 under control of the third control signal S3. The third control signal S3 and the first control signal S1 are different control signals.

For example, the third control signal S3 and the first control signal S1 may be generated by different driving circuits. The third control signal S3 and the first control signal S1 may be independent from each other. A refresh frequency of the third control signal S3 may be a fixed frequency, and the refresh frequency of the third control signal S3 may not to vary as the refresh frequency of the first control signal S1 varies. Of course, the refresh frequency of the third control signal S3 may also be arranged to vary with application scenarios according to the actual requirements.

The refresh frequency of the third control signal S3 is calculated based on the minimum cycle in which the bias adjustment signal DVH is written into the first terminal or the second terminal of the driving transistor T2. In one refresh cycle of the third control signal S3, the bias adjustment module 13 may be turned on once, so that the bias adjustment signal DVH is written into the first terminal or the second terminal of the driving transistor T2 once. It can be understood that, the less the refresh frequency of the third control signal S3 is, the fewer the times that the bias adjustment signal DVH is written into the first terminal or the second terminal of the driving transistor T2 in the same period of time are; conversely, the greater the refresh frequency of the third control signal S3 is, the more the times that the bias adjustment signal DVH is written into the first terminal or the second terminal of the driving transistor T2 in the same period of time are. By resetting the anode of the light-emitting element 20, phenomenon of persistence of vision can be mitigated, and therefore improving display effects. By writing the bias adjustment signal DVH into the first terminal or the second terminal of the driving transistor T2, the bias state of the driving transistor T2 can be adjusted to mitigate the threshold voltage deviation of the driving transistor T2, which improves the display uniformity. However, through research, the inventors of the present application have found that, an influence of the anode reset of the light-emitting element 20 is more important to the display effects. In some optional embodiments, in order to ensure reset effect of the light-emitting element 20, under the first mode or the second mode, the refresh frequency of the first control signal S1 may be greater than or equal to the refresh frequency of the third control signal S3. As such, in the same period of time, the times that the light-emitting element 20 is reset may be more than or same as the times that the bias state of the driving transistor T2 is adjusted, so that a desired reset effect of the light-emitting element 20 can be ensured.

For example, an operation process of the pixel circuit includes a reset stage and a bias stage. The first control signal S1 controls the first reset module 11 to be turned on in the reset stage, and the light-emitting element 20 is reset. The third control signal S3 controls the bias adjustment module 13 to be turned on in the bias stage, and the bias state of the driving transistor T2 is adjusted. In a certain duration, multiple reset stages are uniformly distributed, multiple bias stages are uniformly distributed, and the number of reset stages is greater than or equal to the number of bias stages. As an example, the refresh frequency of the first control signal S1 is an integer multiple of the refresh frequency of the third control signal S3. In a certain duration, the multiple bias stages may be inserted uniformly into a duration occupied by the multiple reset stages, for example, every two reset stages correspond to one bias stage. As such, the multiple reset stages and the multiple bias stages are relatively uniformly distributed, so that a flickering phenomenon of the display panel can be avoided.

Of course, if an influence of adjustment of the bias state of the driving transistor T2 is more important to the display effect, in some other optional embodiments, under the first mode, the refresh frequency of the first control signal S1 may be less than the refresh frequency of the third control signal S3; and under the second mode, the refresh frequency of the first control signal S1 may be equal to the refresh frequency of the third control signal S3. As such, in the same period of time, the times that the light-emitting element 20 is reset may be fewer than the times that the bias state of the driving transistor T2 is adjusted, so that a desired adjusting effect of the bias state of the driving transistor T2 can be ensured. At the same time, under the low brightness mode, the difficulty in charging the anode of the light-emitting element is relatively great, and the display panel is vulnerable to the problem of poor display uniformity, so that under the low brightness mode, the refresh frequency of the first control signal S1 is less than the refresh frequency of the third control signal S3. Under the high brightness mode, the refresh frequency of the first control signal S1 is equal to the refresh frequency of the third control signal S3. As such, the refresh frequency of the third control signal S3 can be kept same under the different modes, and a writing difference of the bias adjustment signal DVH under the different modes can be avoided. In addition, by reducing the refresh frequency of the first control signal S1 only under the low brightness mode to reduce the charging times of the light-emitting element, the overall difficulty in charging the light-emitting element can be reduced to mitigate the problem of poor display uniformity that the display panel is vulnerable to under the low brightness mode.

Figure 12:
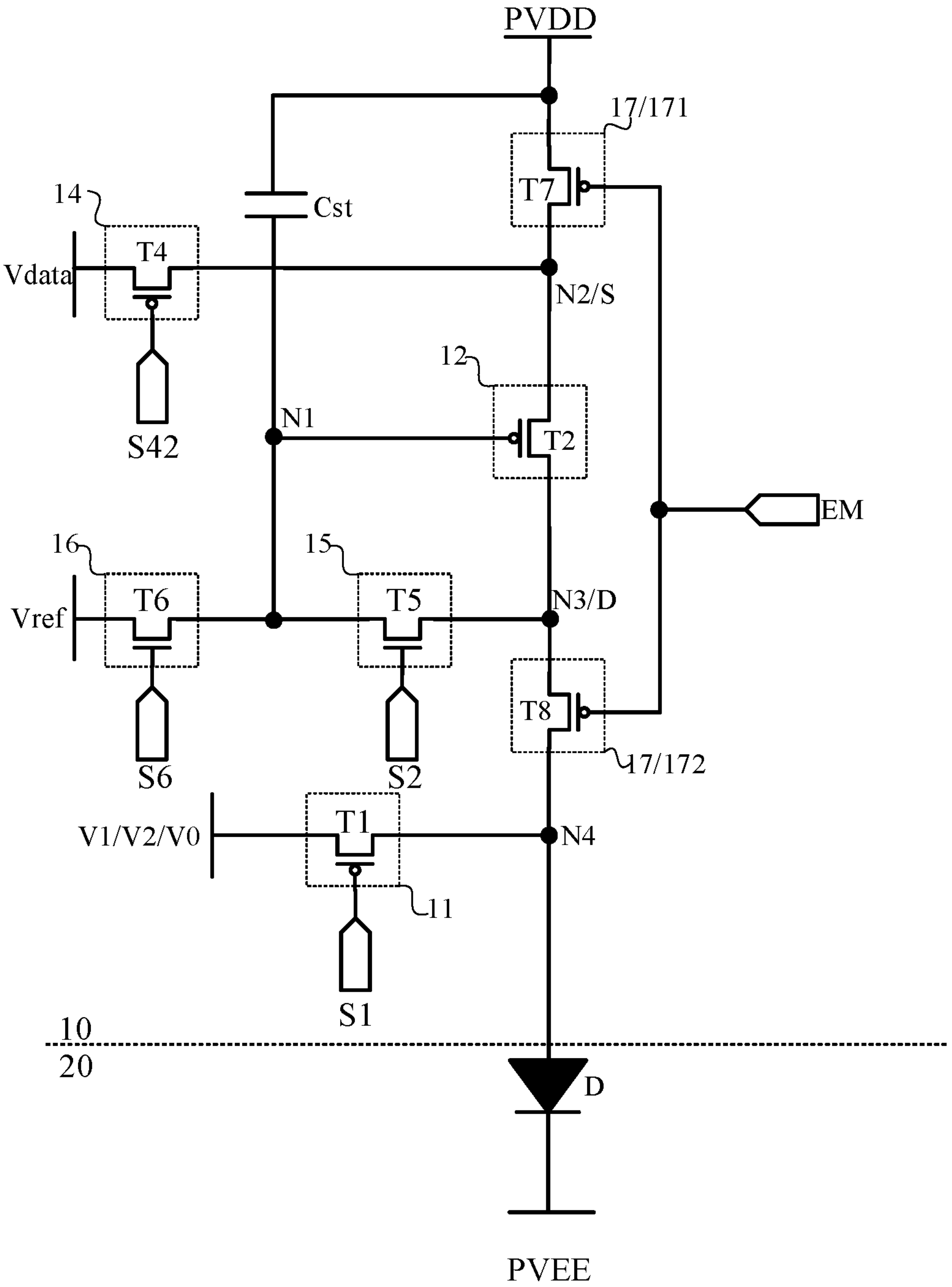
FIG. 12 shows yet another schematic structural diagram of a pixel circuit of a display panel according to an embodiment of the present application.

In some optional embodiments, as shown in FIG. 12, the data writing module 14 of the pixel circuit 10 may be configured to provide the data signal Vdata to the driving module 12 under control of a fourth control signal S42. The fourth control signal S42 and the first control signal S1 may be different control signals.

For example, the fourth control signal S42 and the first control signal S1 may be generated by different driving circuits. The fourth control signal S42 and the first control signal S1 may be independent from each other. A refresh frequency of the fourth control signal S42 may be a fixed frequency, and the refresh frequency of the fourth control signal S42 may not vary as the refresh frequency of the first control signal S1 varies, so as to avoid affecting the data writing module 14 providing the data signal Vdata to the driving module 12 due to the frequency variation of the first control signal S1. Of course, the refresh frequency of the fourth control signal S42 may also be arranged to vary with application scenarios according to the actual requirements.

In an example, the data writing module 14 includes a fourth transistor T4. A gate of the fourth transistor T4 may receive the fourth control signal S42. A first terminal of the fourth transistor T4 may receive the data signal Vdata, and a second terminal of the fourth transistor T4 is electrically connected to the source of the driving transistor T2. The fourth control signal S42 may be a pulse signal. The fourth transistor T4 is controlled to be turned on or turned off by a high level or a low level of the pulse signal.

Figure 13:
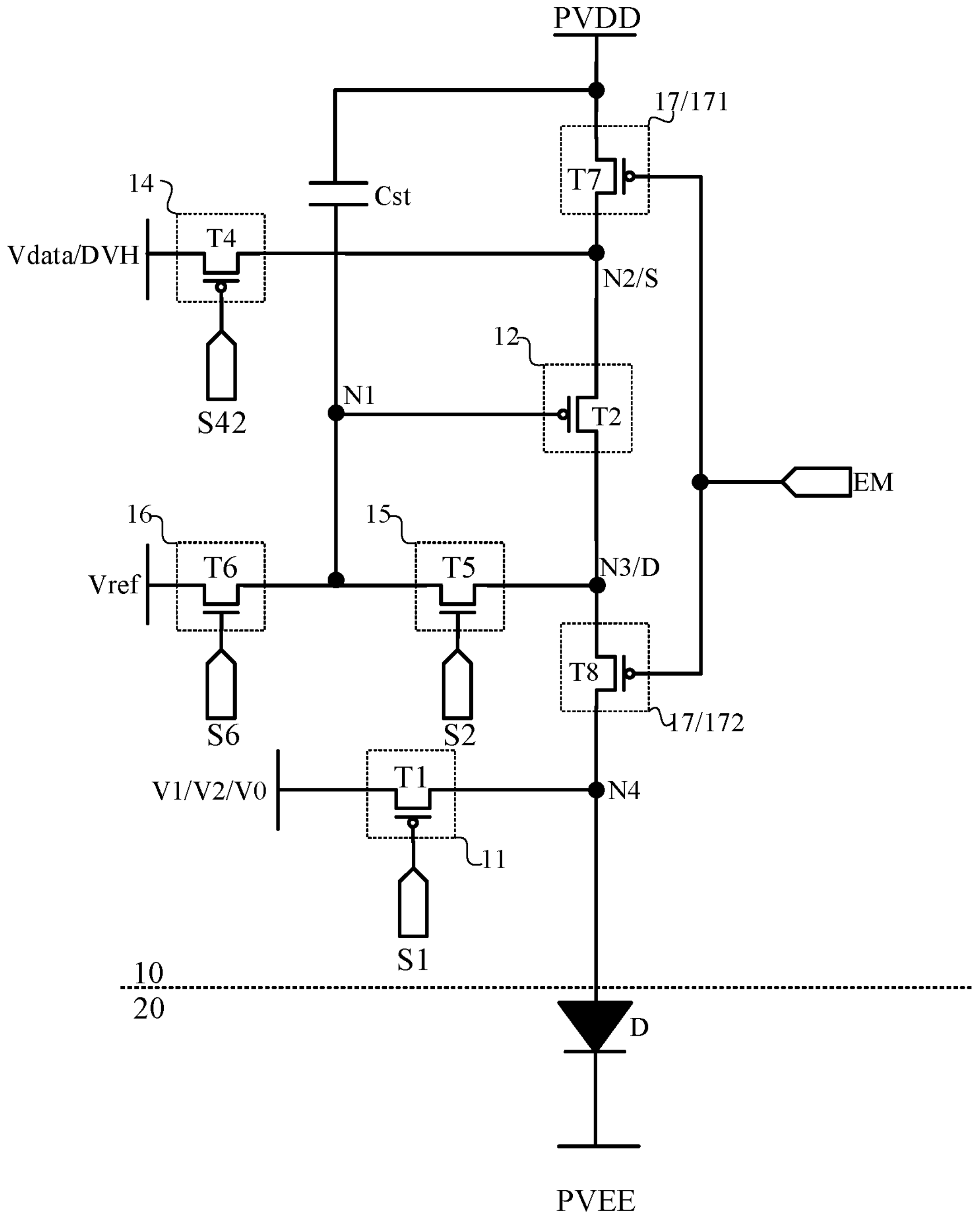
FIG. 13 shows yet another schematic structural diagram of a pixel circuit of a display panel according to an embodiment of the present application.

In some optional embodiments, as shown in FIG. 13, the data writing module 14 of the pixel circuit 10 may be configured to provide the data signal Vdata and the bias adjustment signal DVH to the driving module 12 on time basis under control of the fourth control signal S42. The fourth control signal S42 and the first control signal S1 may be different control signals. An operation process of the pixel circuit 10 may include a data writing stage and a bias stage. The data writing module 14 is reused as the bias adjustment module in the bias stage, and is configured to provide the data signal Vdata in the data writing stage. The data writing module 14 is configured to provide the bias adjustment signal DVH in the bias stage. In the bias stage, the data writing module 14 and the driving module 12 are turned on, the threshold compensating module 15 is turned off, and the bias adjustment signal DVH is written into the drain of the driving transistor T2 for adjusting the bias state of the driving transistor T2.

Here, the bias adjustment signal DVH may be the data signal Vdata provided on a data signal line connected to the pixel circuit 10, or may be a bias adjustment signal additionally provided for the driving chip. A bias adjustment signal is within the protection scope of the present embodiments as long as the bias adjustment signal can be written into the drain of the driving transistor to adjust the bias state of the driving transistor when the data writing module and the driving module are turned on and the threshold compensating module is turned off.

Figure 14:
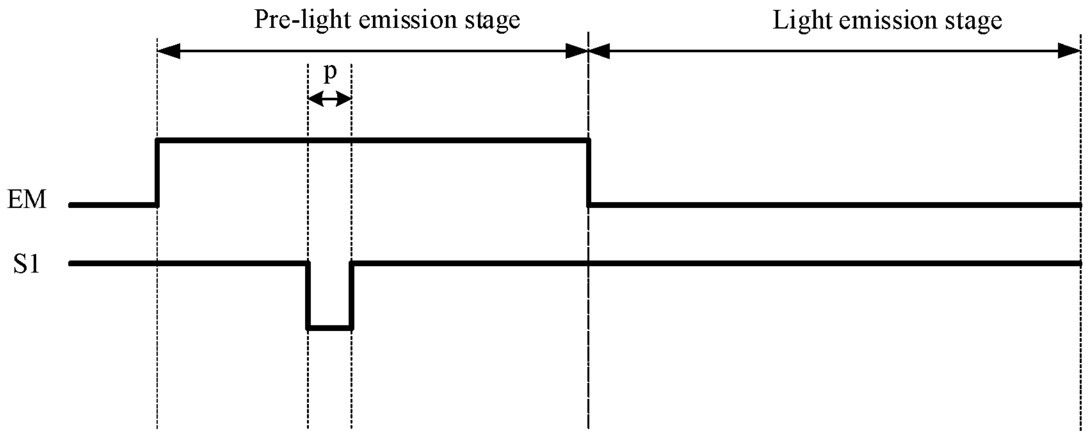
FIG. 14 shows a schematic diagram of a time sequence of a pixel circuit of a display panel according to an embodiment of the present application.

In some optional embodiments, with reference to FIG. 14, in a duration of an image frame of the display panel, an operation process of the pixel circuit may include a pre-light emission stage and a light emission stage. The pre-light emission stage of the pixel circuit includes a reset stage p in a duration of at least one image frame. The first reset module provides the reset signal for the light-emitting element in the reset stage p.

In the present embodiments, in a duration of an image frame of the display panel, the operation process of the pixel circuit includes the pre-light emission stage and the light emission stage. In some cases, the pre-light emission stage and the light emission stage may be carried out sequentially. A pixel circuit structure shown in FIG. 1 is taken as an example. FIG. 1 exemplarily shows that the first reset module 11, the driving module 12, the bias adjustment module 13, the data writing module 14 and the light-emitting control module 17 all include PMOS-type transistors, and the threshold compensating module 15 and an initialization module 16 both include NMOS-type transistors. In the present application, time sequences depicted in FIG. 14 to FIG. 18 may correspond to the pixel circuit structure depicted in FIG. 1. With reference to FIG. 14 and FIG. 1, in a duration of at least one image frame, the pre-light emission stage of the pixel circuit includes the reset stage p. In the reset stage p, the first control signal S1 controls the first reset module 11 to be turned on, and the reset signal V0 is transmitted to the anode of the light-emitting element 20 by the first reset module 11 to reset the light-emitting element 20. By resetting the light-emitting element before the light emission stage, an influence of a current image frame on a next image frame can be avoided.

In addition, since the bias adjustment module 13 is also controlled by the first control signal S1, under a condition that transistors of the bias adjustment module 13 and the first reset module 11 are of the same type, in the reset stage p, the first control signal S1 can control the bias adjustment module 13 to be turned on, and the bias adjustment signal DVH is transmitted to the driving transistor T2 by the bias adjustment module 13 to adjust the bias state of the driving transistor T2. That is, the reset stage p is also a bias adjustment stage, the reset stage p may completely overlap the bias adjustment stage, and the bias state of the driving transistor can be adjusted when resetting the light-emitting element.

In some optional embodiments, as shown in any one of FIG. 1, and FIG. 5 to FIG. 7, the pixel circuit further includes the data writing module 14 configured to selectively provide the data signal Vdata for the driving module 12.

Figure 15:
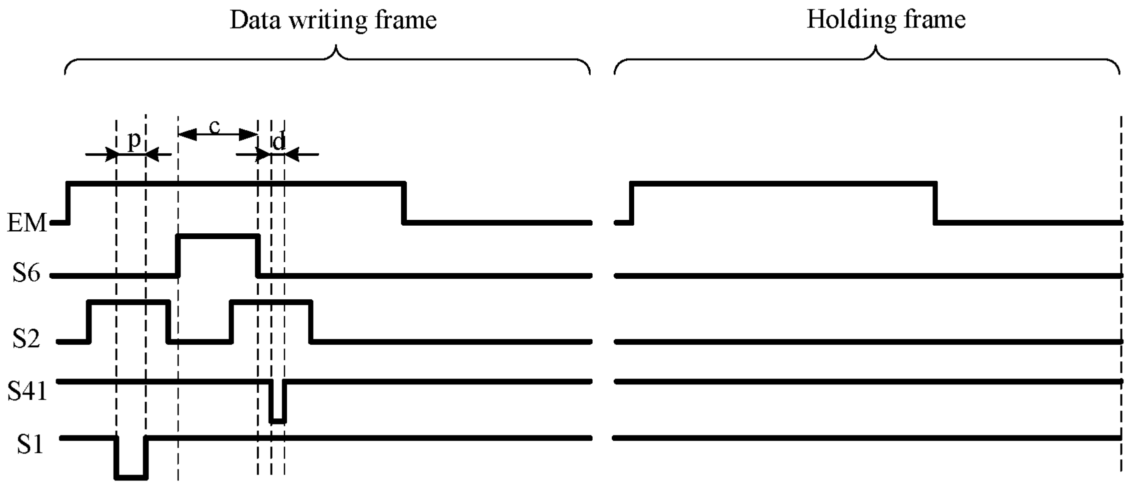
FIG. 15 shows another schematic diagram of a time sequence of a pixel circuit of a display panel according to an embodiment of the present application.

With reference to FIG. 1 and FIG. 15, one data writing cycle of the display panel includes in total S frames of refreshed images, and S>0. The data writing cycle may include a data writing frame and a holding frame. The holding frame does not include the data writing stage. A frame is calculated based on a minimum cycle of one light emission stage. The data writing module 14 provides the data signal Vdata to the driving transistor T2 in the data writing frame and does not provide the data signal Vdata to the driving transistor T2 in the holding frame any more.

The data writing frame may include a data writing stage d. The pixel circuit may include a threshold compensating module 15. In the data writing stage d, the threshold compensating module 15 may be turned on, and the data signal transmitted by the data writing module 14 may be written into the gate of the driving transistor T2 via the threshold compensating module 15.

At least the data writing frame includes the reset stage p. The reset stage p may be carried out before the data writing stage d, that is, the light-emitting element is reset before the data signal is written into the gate of the driving transistor T2, so as to avoid an influence of gate potential of the driving transistor T2 in the previous stage on the data signal writing which affects the display effect of the display panel. At the same time, the bias adjustment module 13 may be in an ON-state in the reset stage p, and the bias adjustment signal DVH may be written into the source of the driving transistor T2. Since the gate of the driving transistor T2 is not initialized before the reset stage p, the gate voltage of the driving transistor T2 is the data voltage written in the previous frame. The driving transistor T2 is turned on in the reset stage p, and the bias adjustment signal DVH may be written into the drain of the driving transistor T2. As such, the voltage difference between the gate of the driving transistor T2 and the drain of the driving transistor T2 can be adjusted before the data signal is written into the gate of the driving transistor T2, thereby adjusting the bias state of the driving transistor T2 and ensuring consistency of characteristics of the driving transistor T2 to further ensure consistency of the data signal writing, which further improves the display uniformity. In addition, with further reference to FIG. 15, the threshold compensating module 15 may be in an ON-state in the reset stage p. Since the driving transistor T2 is turned on in the reset stage p, the bias adjustment signal DVH can also be written into the gate of the driving transistor T2, so that the gate potential of the driving transistor T2 can be processed uniformly before the data signal is written into the gate of the driving transistor T2, which can further ensure the consistency of the characteristics of the driving transistor T2 to improve the display uniformity.

In some optional embodiments, as shown in any one of FIG. 1, and FIG. 5 to FIG. 7, the pixel circuit further includes the initialization module 16 configured to transmit an initialization signal Vref to the gate of the driving transistor T2 under control of a sixth control signal S6. In an example, the initialization module 16 may include a sixth transistor T6. A gate of the sixth transistor T6 may receive the sixth control signal S6. A first terminal of the sixth transistor T6 may receive the initialization signal Vref, and a second terminal of the sixth transistor T6 is electrically connected to the gate of the driving transistor T2. The sixth control signal S6 may be a pulse signal, and the sixth transistor T6 is controlled to be turned on or turned off by a high level or a low level of the pulse signal. Herein, a voltage of the initialization signal Vref may be a negative voltage less than 0 V.

With reference to FIG. 1 and FIG. 15, at least the data writing frame further includes an initialization stage c. In the initialization stage c, the initialization module 16 is turned on, the initialization signal Vref is transmitted to the gate of the driving transistor T2 via the initialization module 16, and the gate of the driving transistor T2 receives the initialization signal Vref for initialization. A duration of the reset stage is t1, a duration of the initialization stage c is t2, and $t1<t2$.

The voltage difference between the gate of the driving transistor T2 and the source of the driving transistor T2 or the voltage difference between the gate of the driving transistor T2 and the drain of the driving transistor T2 may be adjusted in the initialization stage c, so that the threshold voltage deviation of the driving transistor T2 can be alleviated or offset and the bias state of the driving transistor T2 may be adjusted in the initialization stage. Since the bias adjustment module 13 is also controlled by the first control signal S1, under a condition that transistors of the bias adjustment module 13 and the first reset module 11 are of the same type, in the reset stage p, the first control signal S1 can control the bias adjustment module 13 to be turned on, and the bias adjustment signal DVH is transmitted to the source or the drain of the driving transistor T2 by the bias adjustment module 13 to adjust the bias state of the driving transistor T2. Since the initialization stage c may also have a function of adjusting the bias state of the driving transistor T2, a voltage value of the bias adjustment signal DVH can be arranged to be relatively small under a condition that the duration of the initialization stage c is greater than a duration of the reset stage p, so that overall bias adjustment effects on the driving transistor T2 is not weakened, and reducing the voltage value of the bias adjustment signal DVH can achieve a purpose of reducing the power consumption to a certain extent.

For example, the greater the duration of the initialization stage is, the smaller the voltage value of the bias adjustment signal DVH can be.

Figure 16:
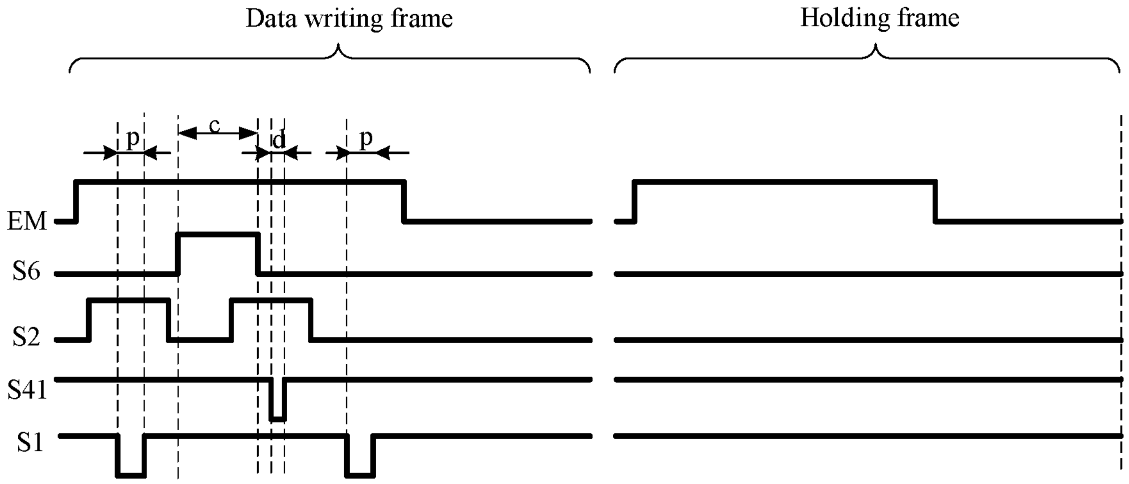
FIG. 16 shows yet another schematic diagram of a time sequence of a pixel circuit of a display panel according to an embodiment of the present application.

In other optional embodiments, with reference to FIG. 1 and FIG. 16, the number of the reset stages p included in at least one data writing frame is greater than the number of the initialization stages c included in at least one data writing frame. For example, at least one data writing frame can include M initialization stages c and N reset stages p, $N>M\geq1$, and N and M are integers.

As described previously, since the bias adjustment module 13 is also controlled by the first control signal S1, under the condition that the transistors of the bias adjustment module 13 and the first reset module 11 are of the same type, the first control signal S1 can control the bias adjustment module 13 to be turned on, so that the bias adjustment module 13 can be in an ON-state in N reset stages, and the bias state of the driving transistor T2 can be adjusted by the bias adjustment module 13 for N times in at least one data writing frame.

The data writing frame may include the data writing stage d, and the data signal Vdata can be written into the gate of the driving transistor T2 in the data writing stage d.

As an example, at least one reset stage p of the N reset stages p can be carried out before the data writing stage d, and the bias adjustment module 13 can be in an ON-state in the reset stage p, so that the bias state of the driving transistor T2 can be adjusted before the data signal is written into the gate of the driving transistor T2, thereby ensuring the uniformity of the characteristics of the driving transistor T2 to further ensure the uniformity of the data signal writing, which further improves the display uniformity.

Through further research, the inventors of the present application have found that, after the data signal is written into the gate of the driving transistor T2, the state of the driving transistor T2 is not stable, and the threshold voltage of the driving transistor T2 can still change to a certain extent, thus causing a threshold voltage Vth of the driving transistor T2 to be unstable at the beginning of the light emission stage, which results in a change in the brightness of the light that is emitted at the beginning of the light emission stage.

In view of this, it is considered in the present application that the bias state of the transistor T2 is adjusted between the data writing stage and the light emission stage, and then the threshold voltage of the driving transistor T2 is adjusted again, so that a characteristic curve of the driving transistor T2 recovers to a normal threshold voltage to which the data signal corresponds when the data signal is written as soon as possible, so as to avoid the change in the brightness of emitted light at the beginning of the light emission stage.

As yet another example, at least one reset stage of the N reset stages can be carried out after the data writing stage d and before the light emission stage, and the bias adjustment module 13 can be in an ON-state in the reset stage p, so that the bias state of the driving transistor T2 can be adjusted between the data writing stage d and the light emission stage, thereby ensuring the uniformity of the characteristics of the driving transistor T2 and reducing a difference in the writing and the light emission caused by factors including different display gray scales or different data signals of the previous frame, which effectively avoids the change in the brightness of emitted light at the beginning of the light emission stage to further improve the display uniformity.

Figure 17:
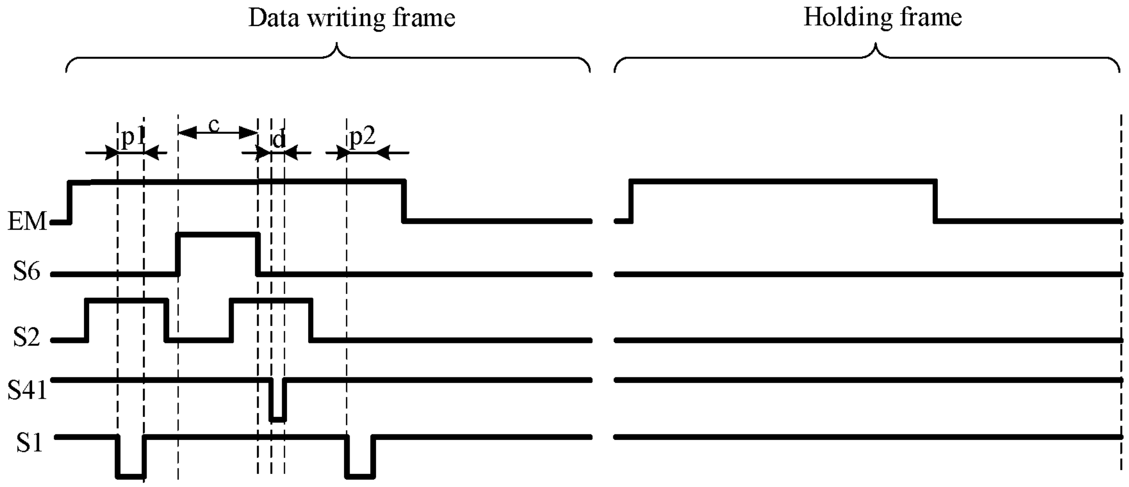
FIG. 17 shows yet another schematic diagram of a time sequence of a pixel circuit of a display panel according to an embodiment of the present application.

In some optional embodiments, with reference to FIG. 1 and FIG. 17, at least one data writing frame can include multiple reset stages, and durations of at least two reset stages can the same.

For example, at least one data writing frame includes a first reset stage p1 and a second reset stage p2, a duration of the first reset stage p1 is t3, a duration of the second reset stage p2 is t4, and $t3=t4$.

The bias adjustment module 13 can be in an ON-state in the reset stage, and since the durations of the two reset stages are the same, a voltage value of the bias adjustment voltage DVH in the first reset stage and the second reset stage may be the same, so that a substantially same bias adjustment effect can be achieved in different reset stages. In addition, switching the voltage value of the bias adjustment voltage DVH in different period of time can be avoided, and the power consumption can be reduced.

Of course, the durations of the first reset stage and the second reset stage may be different, and the voltage value of the bias adjustment voltage DVH can be arranged in the first reset stage and the second reset stage according to the actual requirements. For example, under a condition that t3>t4, the voltage value of the bias adjustment voltage DVH in the first reset stage can be less than the voltage value of the bias adjustment voltage DVH in the second reset stage. As another example, under a condition that t3<t4, the voltage value of the bias adjustment voltage DVH in the first reset stage may be greater than the voltage value of the bias adjustment voltage DVH in the second reset stage.

In an example, the threshold compensating module 15 may be in an ON-state in the first reset stage p1; the threshold compensating module 15 may be in an OFF-state in a second reset stage p2.

Figure 18:
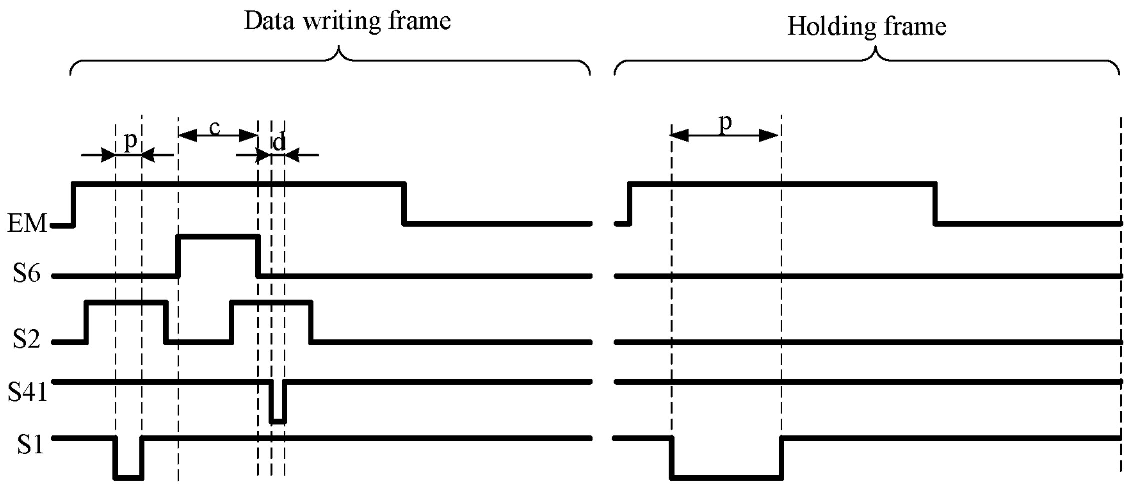
FIG. 18 shows yet another schematic diagram of a time sequence of a pixel circuit of a display panel according to an embodiment of the present application.

In some optional embodiments, with reference to FIG. 1 and FIG. 18, at least one holding frame includes the reset stage p, and the duration of the reset stage p in at least one holding frame is greater than the duration of the reset stage in the data writing frame.

The initialization stage may be included in the data writing frame, the initialization signal Vref may be written into the gate of the driving transistor in the initialization stage to initialize the gate of the driving transistor. A gate signal of the driving transistor may not be refreshed in the holding frame; that is, the gate of the driving transistor may not be initialized in the holding frame. Therefore, the bias state of the driving transistor can be adjusted only by the bias adjustment module 13 in the holding frame.

The bias adjustment module 13 can be in the ON-state in the reset stage. As such, by increasing the duration of the reset stage in the holding frame, a turned-on duration of the bias adjustment module 13 in the holding frame can be increased, so that a duration in which the driving transistor is under the bias adjustment state in the holding frame can be increased. Therefore, the bias adjustment effect of the bias adjustment module 13 on the driving transistor in the holding frame tend to be consistent with the bias adjustment effect in a data refresh frame, and thereby reducing the difference between the threshold voltage of the driving transistor in the holding frame and the threshold voltage of the driving transistor in the data writing frame, which reduces a difference between brightness of the data writing frame and brightness of the holding frame to further improve the display uniformity.

Figure 8:
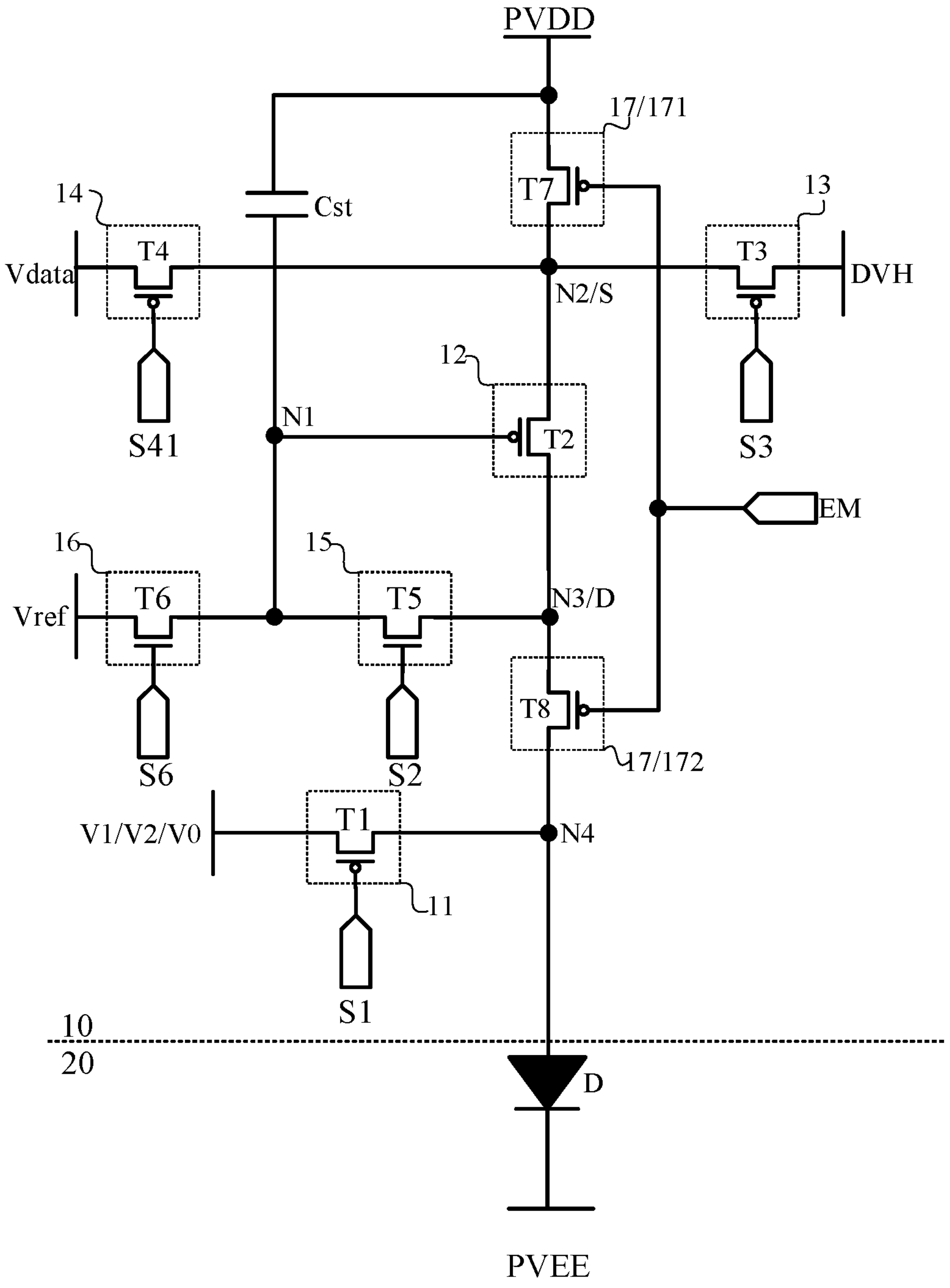
FIG. 8 shows yet another schematic structural diagram of a pixel circuit of a display panel according to an embodiment of the present application.
Figure 9:
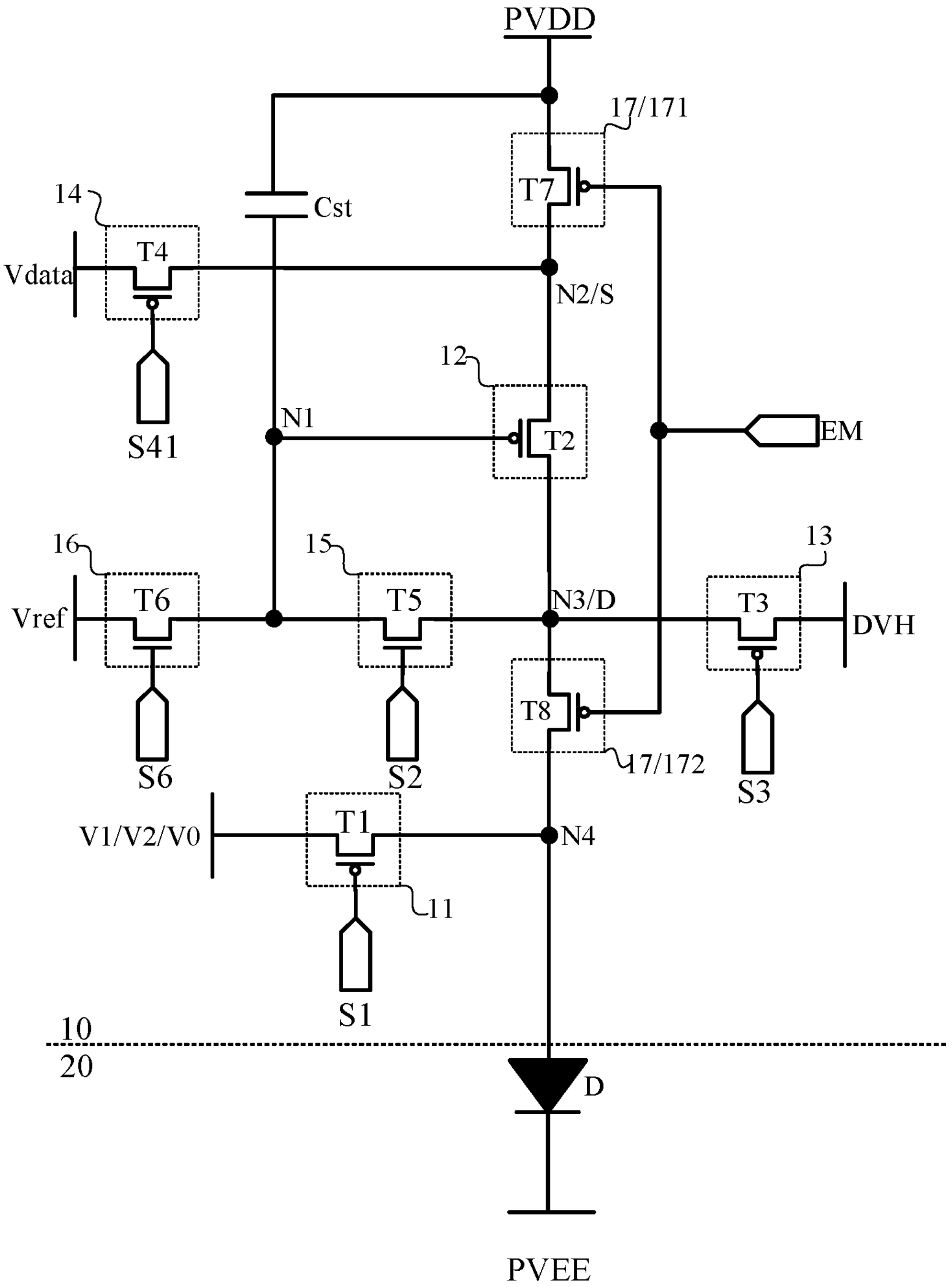
FIG. 9 shows yet another schematic structural diagram of a pixel circuit of a display panel according to an embodiment of the present application.
Figure 10:
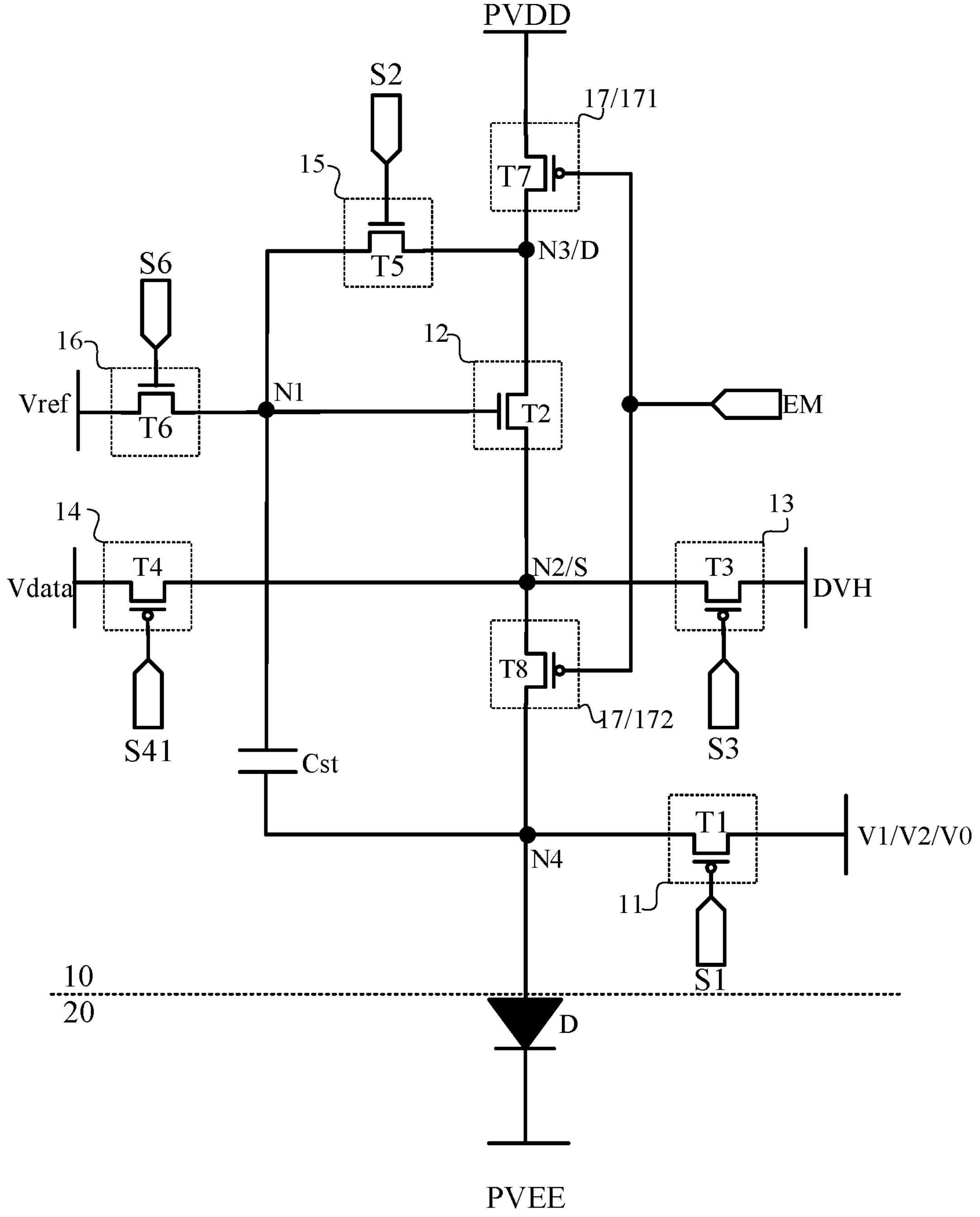
FIG. 10 shows yet another schematic structural diagram of a pixel circuit of a display panel according to an embodiment of the present application.
Figure 11:
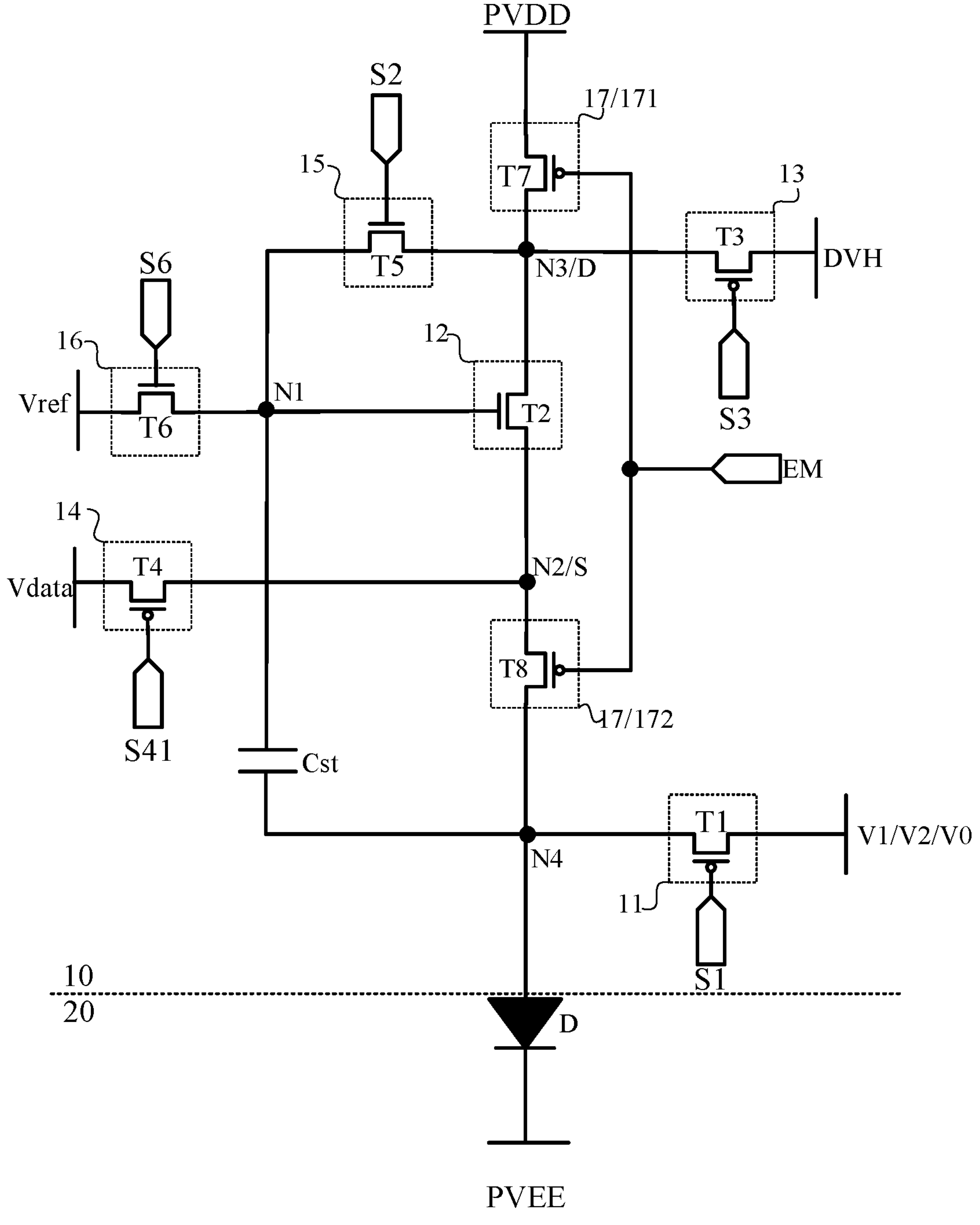
FIG. 11 shows yet another schematic structural diagram of a pixel circuit of a display panel according to an embodiment of the present application.

The diagrams of the time sequences shown in FIG. 14 to FIG. 18 gives an example where the first reset module 11 and the bias adjustment module 13 both use the first control signal S1. As shown in FIG. 8, the first reset module 11 and the bias adjustment module 13 may receive the different control signals. FIG. 8 exemplarily shows that the first reset module 11, the driving module 12, the bias adjustment module 13, the data writing module 14 and the light-emitting control module 17 all include PMOS-type transistors, and the threshold compensating module 15 and the initialization module 16 both include NMOS-type transistors. In the present application, the diagrams of the time sequences depicted in FIG. 19 and FIG. 20 may correspond to the pixel circuit structure depicted in FIG. 8.

Figure 19:
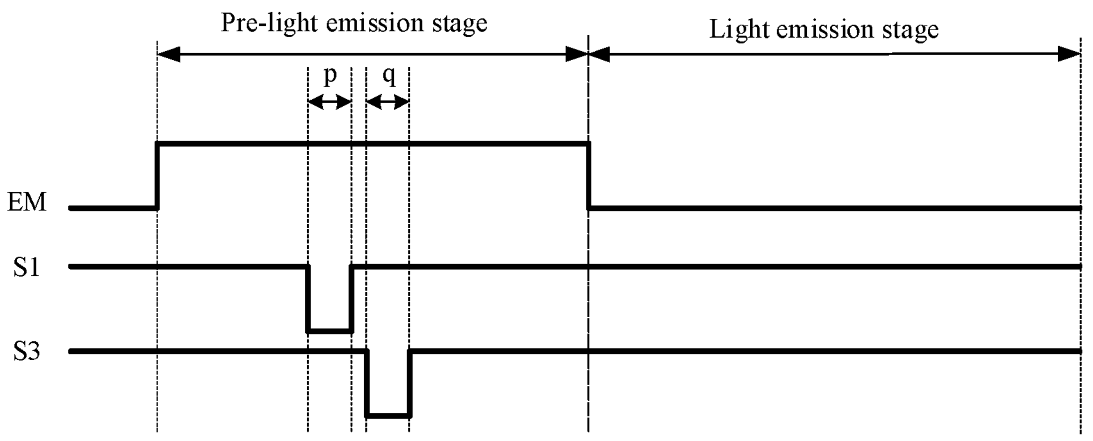
FIG. 19 shows a schematic diagram of time sequence of a first control signal of a display panel according to an embodiment of the present application.

As an example, with reference to FIG. 8 and FIG. 19, in a duration of one image frame of the display panel, the operation process of the pixel circuit includes the pre-light emission stage and the light emission stage. The pre-light emission stage of the pixel circuit includes the reset stage p and the bias stage q in a duration of at least one image. In the reset stage p, the first control signal S1 controls the first reset module 11 to be turned on, and the reset signal V0 is transmitted to the anode of the light-emitting element 20 by the first reset module 11 to reset the light-emitting element 20. In the bias stage q, the third control signal S3 may control the bias adjustment module 13 to be turned on, and the bias adjustment signal DVH is transmitted to the source of the driving transistor T2 by the bias adjustment module 13 to adjust the bias state of the driving transistor T2.

Since the first control signal S1 and the third control signal S3 can be the signals independent from each other, in the pre-light emission stage, the reset stage p may be not overlapped with the bias stage q on time basis, or the reset stage p may be overlapped with the bias stage q on time basis. FIG. 19 shows that the reset stage p is not overlapped with the bias stage q on time basis and the bias stage q shown to be after the reset stage p, which is not used to limit the present application.

In addition, multiple bias stages q may be included in the pre-light emission stage. For example, the pre-light emission stage may further include the data writing stage, and at least one bias stage q may be included before and after the data writing stage.

Figure 20:
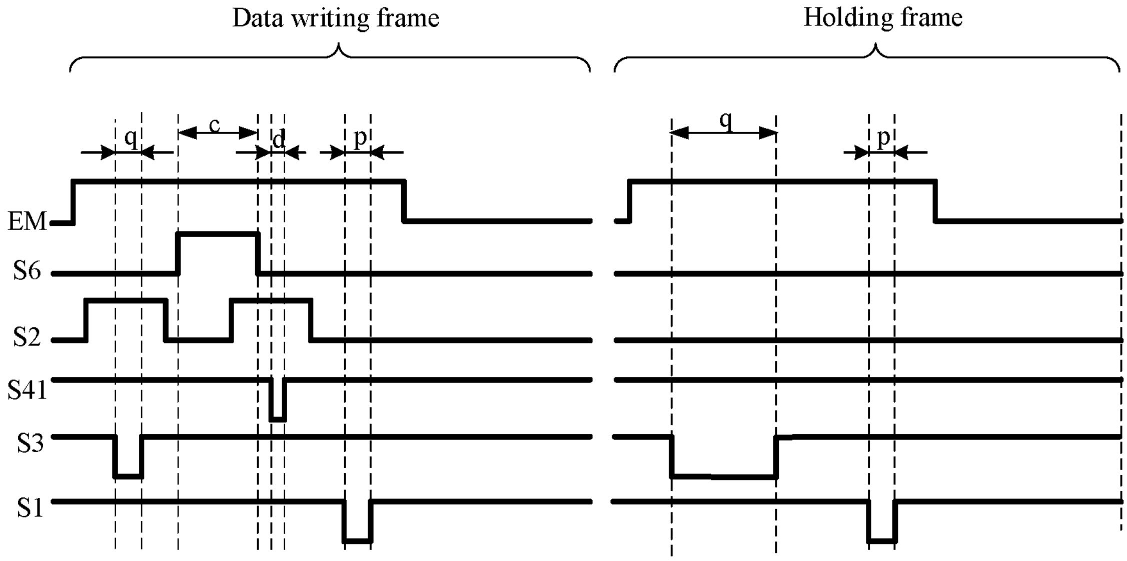
FIG. 20 shows a schematic diagram of an operation process of a pixel circuit of a display panel according to an embodiment of the present application.

As yet another example, with reference to FIG. 8 and FIG. 20, one data writing cycle of the display panel includes in total S frames of refreshed images, and S>0. The data writing cycle may include the data writing frame and the holding frame, and the holding frame does not include the data writing stage. The data writing frame may include at least one reset stage p and at least one bias stage q. The holding frame may include at least one reset stage p and at least one bias stage q. Similarly, in the data writing stage or the holding stage, the reset stage p may be not overlapped with the bias stage q on time basis, or the reset stage p may be overlapped with the duration of the bias stage q on time basis. FIG. 20 shows that in the data writing frame and the holding frame, the reset stage p is not overlapped with the bias stage q on time basis and the bias stage q is shown to be before the reset stage p, which is not used to limit the present application. In an example, the number of the data writing stages may be multiple in the data writing frame, and a sum of the durations of the multiple bias stages in the data writing frame may be less than the duration of the bias stage in the holding frame. The duration of the reset stage in the data writing frame may be equal to the duration of the reset stage in the holding frame.

Figure 21:
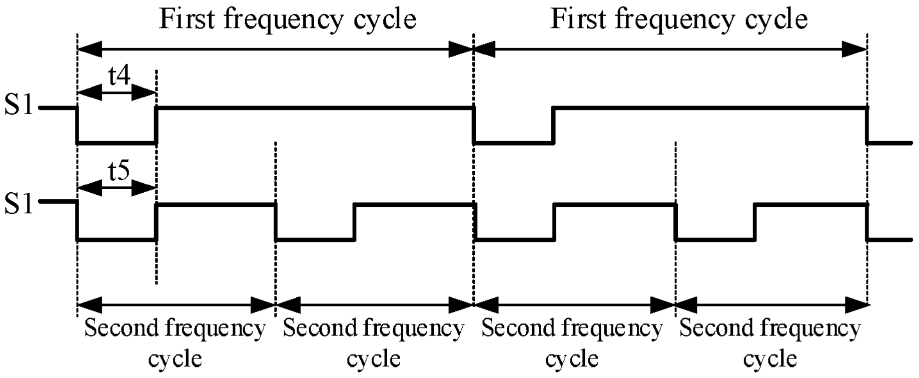
FIG. 21 shows another schematic diagram of an operation process of a pixel circuit of a display panel according to an embodiment of the present application.

The refresh frequency of the first control signal is different under the different modes, and in order to ensure reset effect of the light-emitting element under the different modes, a duration in which the light-emitting element is reset each time may be equal under the different light emitting modes. Specifically, as shown in FIG. 21, an ON-level of the first control signal S1 being a low level and an OFF-level of the first control signal S1 being a high level is taken as an example, under the first mode, a refresh cycle of the first control signal S1 is a first refresh cycle, and in the first refresh cycle, a duration for which the first control signal is at the ON-level is t4. Under the second mode, the refresh cycle of the first control signal S1 is a second refresh cycle, in the second refresh cycle, the duration for which to the first control signal S1 is at the ON-level is t5, and t4=t5.

Under the first mode, the refresh frequency of the first control signal S1 is F1, and a duration of the first refresh cycle is 1/F1. Under the second mode, the refresh frequency of the first control signal S1 is F2 and the duration of the first refresh cycle is 1/F2. F1<F2, the duration of the first refresh cycle is greater than the duration of the second refresh cycle. A duration for which the first control signal S1 is at the OFF-level in the first refresh cycle is greater than the duration for which the first control signal S1 is at the OFF-level in the second refresh cycle.

In some optional embodiments, as shown in FIG. 1 and any one of FIG. 5 to FIG. 13, the pixel circuit further includes the light-emitting control module 17 configured to cause the light-emitting element 20 to enter the light emission stage under control of a fifth control signal EM, and the refresh frequency of the first control signal S1 may be less than or equal to a refresh frequency of the fifth control signal EM.

When the light-emitting control module 17 is turned on, the drive current generated by the driving module 12 may be transmitted to the light-emitting element 20 to control the light-emitting element 20 to enter the light emission stage.

The refresh frequency of the fifth control signal EM is calculated based on a minimum cycle in which the drive current is written into the light-emitting element 20. In one refresh cycle of the fifth control signal EM, the light-emitting control module 17 may be turned on once, and the drive current may be transmitted to the light-emitting element 20, so that the light-emitting element 20 enters a light emission stage. It can be understood that, the greater the refresh frequency of the fifth control signal EM is, the greater the number of times that the light-emitting element 20 enters the light emission stage in the same period of time is. Since the refresh frequency of the first control signal S1 is less than or equal to the refresh frequency of the fifth control signal EM, the times for resetting the light-emitting element 20 is fewer than or equal to the times that the light-emitting element 20 enters the light emission stage in the same period of time, and since the times for resetting the light-emitting element 20 is relatively few, the times for charging the light-emitting element 20 when the light-emitting element 20 emits light may be relatively few, so that the overall difficulty in charging the light-emitting element can be further reduced to mitigate the problem of poor display uniformity that the display panel is vulnerable to under the low brightness mode.

In an example, the light-emitting control module 17 may include a first light-emitting control module 171 and a second light-emitting control module 172. The first light-emitting control module 171 may include a seventh transistor T7. A gate of the seventh transistor T7 may receive the fifth control signal EM. A first terminal of the seventh transistor T7 is electrically connected to the positive first power supply signal PVDD. A second terminal of the seventh transistor T7 may be electrically connected to the first terminal of the driving transistor T2. The second light-emitting control module 172 may include an eighth transistor T8. A gate of the eighth transistor T8 may receive the fifth control signal EM. A first terminal of the eighth transistor T8 is electrically connected to the second terminal of the driving transistor T2. A second terminal of the eighth transistor T8 may be electrically connected to the anode of the light-emitting element 20. A cathode of the light-emitting element 20 is electrically connected to a negative second power supply signal PVEE.

The fifth control signal EM may be the pulse signal. The seventh transistor T7 and the eighth transistor T8 are controlled to be turned on or turned off by the high level or the low level of the pulse signal.

In some optional embodiments, the reset signal may be different under different brightness modes. Specifically, the reset signal is V1 under the first mode, the reset signal is V2 under the second mode, and V1>V2. V1 and V2 may be a negative voltage less than 0 V.

As described above, when the light-emitting element emits light, the anode of the light-emitting element is required to be raised from the reset voltage to the target voltage. The greater a difference between the target voltage and the reset voltage is, the more difficult it is for the anode of the light-emitting element to be raised to the target voltage. In the embodiments of the present application, by setting V1 to be greater than V2, equivalently, the difference between the target voltage and the reset voltage is reduced under the first mode, so that the difficulty in charging the light-emitting element is reduced to further mitigate the problem of poor display uniformity that the display panel is vulnerable to under the low brightness mode.

Figure 22:
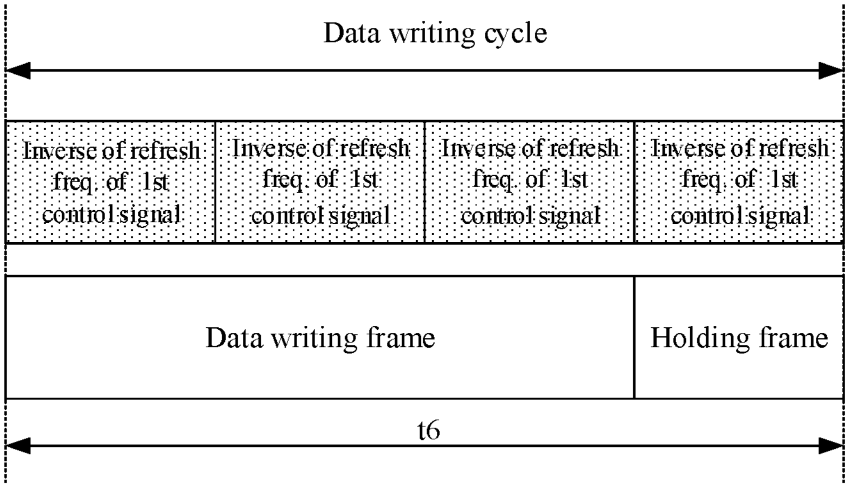
FIG. 22 shows yet another schematic diagram of an operation process of a pixel circuit of a display panel according to an embodiment of the present application
Figure 23:
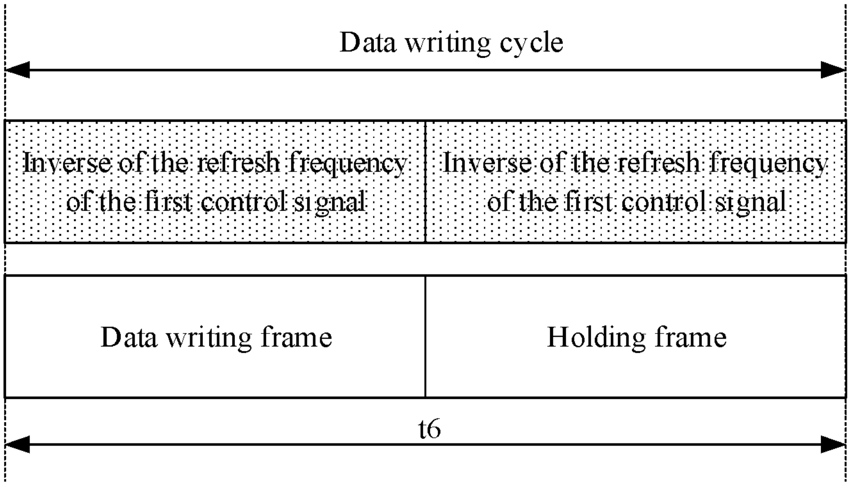
FIG. 23 shows a flow chart of a method for driving a display panel according to an embodiment of the present application.

In some optional embodiments, as shown in FIG. 22 or FIG. 23, one data writing cycle of the display panel includes in total S frames of refreshed images including a data writing frame and a holding frame, and S>0. A duration of at least one holding frame may be equal to an inverse of the refresh frequency of the first control signal.

FIG. 22 and FIG. 23 merely for illustration show the duration occupied by the data writing frame, the holding frame and the inverse of the refresh frequency of the first control signal, which does not represent a specific variation situation of the respective control signals.

The inverse of the refresh frequency of the first control signal is equal to the refresh cycle of the first control signal, and thus the duration of the holding frame is equal to the duration of the refresh cycle of the first control signal. Multiple refresh cycles of the first control signal are carried out sequentially in a certain duration. Since the duration of the holding frame is equal to the duration of the refresh cycle of the first control signal, starting moments of the holding frames may be respectively equal to the starting moments of the refresh cycles of the first control signal, so that the holding frame and the refresh cycle of the first control signal are synchronized on time basis. Multiple holding frames and multiple refresh cycles of the first control signal may be uniformly distributed in a certain duration, which can avoid the flickering phenomenon of the display panel.

In an example, the duration of the data writing frame may be an integer multiple of the duration of the holding frame.

In some optional embodiments, with further reference to FIG. 22 or FIG. 23, a sum of the duration of the data writing frame and the duration of the holding frame is t6, and t6 is an integer multiple of the inverse of the refresh frequency of the first control signal.

The inverse of the refresh frequency of the first control signal is equal to the refresh cycle of the first control signal, and thus t6 is an integer multiple of the duration of the refresh cycle of the first control signal. As shown in FIG. 22, t6 may be four times of the duration of the refresh cycle of the first control signal, or, as shown in FIG. 23, t6 may be two times of the duration of the refresh cycle of the first control signal.

Similarly, the multiple refresh cycles of the first control signal may be uniformly distributed in the data writing cycle, which can avoid the flickering phenomenon of the display panel.

As shown in FIG. 24, the refresh frequencies of the control signal S2, the control signal S41 and the control signal S6 may be equal, Active1 represents the refresh cycle of the first control signal S1, Active2 represents the refresh cycles of the control signal S2, the control signal S41 and the control signal S6, and Active5 represents the refresh cycle of the fifth control signal EM, and hold represents the holding frame.

As some examples, the refresh frequency of the fifth control signal EM under the different modes may be equal, for example, the refresh frequency of the fifth control signal EM may be fixed to be 360 HZ. The refresh frequency of each control signal may be selected from combination 2 or combination 4 under the first mode, and the refresh frequency of each to control signal may be selected from combination 1 or combination 2 under the second mode.

FIG. 24 is merely some examples and is not used to limit the present application.

It should be noted that, the transistors in the embodiments of the present application may be NMOS-type transistors or PMOS-type transistors. For NMOS type transistor, the ON-level is the high level and the OFF-level is the low level. That is, when a gate of the NMOS-type transistor is at the high level, the first terminal and the second terminal of the NMOS-type transistor are turned on, and when the gate of the NMOS-type transistor is at the low level, the first terminal and the second terminal of the NMOS-type transistor are turned off. For the PMOS-type transistor, the ON-level is the low level and the OFF-level is the high level. That is, when a control terminal of the PMOS-type transistor is at the low level, the first terminal and the second terminal of the PMOS-type transistor are turned on, and when the control terminal of the PMOS-type transistor is at the high level, the first terminal and the second terminal of the PMOS-type transistor are turned off. In a specific implementation, the gate of each transistor mentioned-above functions as the control terminal of the transistor, and according to the signal of the gate of each transistor and the type of the transistor, the first terminal of the transistor may function as the source and the second terminal of the transistor may function as the drain, or the first terminal of the transistor may function as the drain and the second terminal of the transistor may function as the source, which are not specifically distinguished. In addition, the ON-level and the OFF-level in the embodiments of the present application are generic reference, the ON-level refers to any level capable of turning on the transistor, and the OFF-level refers to any level capable of turning off the transistor.

In the embodiments and drawings of the present application, the first transistor T1, the third transistor T3, the fourth transistor T4, the seventh transistor T7 and the eighth transistor T8 are shown as only PMOS-type transistors, but these transistors may be NMOS-type transistors, which is not limited in the present application. In addition, in the embodiments and the drawings of the present application, the fifth transistor T5 and the sixth transistor T6 are shown as only NMOS-type transistors, but these transistors may be PMOS-type transistors, which is not limited in the present application. Based on the technical concept the same as that of the display panel provided by the above embodiments, accordingly, the embodiments of the present application further provide a method for driving the display panel, the method may be applicable to the display panel provided by the above embodiments.

As shown in FIG. 1, the display panel may include the pixel circuit 10 including the first reset module 11 and the light-emitting element 20. The first reset module 11 may be electrically connected to the anode of the light-emitting element 20. The first reset module 11 may be turned on or turned off under control of the first control signal S1, and when the first control signal S1 controls the reset module 11 to be turned on, the first reset module 11 can transmit the reset signal V0 to the anode of the light-emitting element 20 to reset the light-emitting element 20. The light-emitting element 20 includes, but is not limited to, an organic light-emitting diode (OLED).

The operation modes of the display panel may include the first mode and the second mode, the brightness of the display panel is L1 under the first mode, the brightness of the display panel is L2 under the second mode, and L1<L2.

Figure 25:
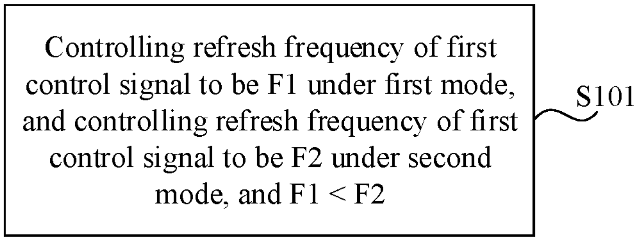
FIG. 25 shows yet another flow chart of a method for driving a display panel according to an embodiment of the present application.

FIG. 25 is a schematic flowchart of a method for driving the display panel according to an embodiment of the present application. As shown in FIG. 25, the method for driving the display panel includes step S101.

At step S101, the refresh frequency of the first control signal is controlled to be F1 under the first mode, and the refresh frequency of the first control signal is controlled to be F2 under the second mode, where F1<F2.

According to the method for driving the display panel provided in the embodiments of the present application, different refresh frequencies are used to reset the light-emitting element when the display panel has the different brightness under the different brightness modes, and the relatively low refresh frequency is used to reset the light-emitting element under the low brightness mode. In contrast to the high brightness mode, the times for resetting the light-emitting element under the low brightness mode are fewer in the same period of time, that is, the times for charging the light-emitting element are reduced, so that the overall difficulty in charging the light-emitting element can be reduced to mitigate the problem of poor display uniformity that the display panel is vulnerable to under the low brightness mode.

In some optional embodiments, as shown in FIG. 1, FIG. 5, FIG. 6, and FIG. 7, the pixel circuit 10 may further include the driving module 12 and a bias adjustment module 13. The driving module 12 is configured to provide the drive current for the light-emitting element 20, and the driving module 12 includes a driving transistor T2. The bias adjustment module 13 is configured to provide a bias adjustment signal DVH for a first terminal or a second terminal of the driving transistor T2 under control of the first control signal S1. The to pixel circuit 10 may further include a data writing module 14 and a threshold compensating module 15. The data writing module 14 is configured to transmit the data signal Vdata, and the threshold compensating module 15 is configured to write the data signal Vdata into the driving module 12 and compensate the threshold voltage of the driving module 12 under control of the second control signal S2.

Figure 26:
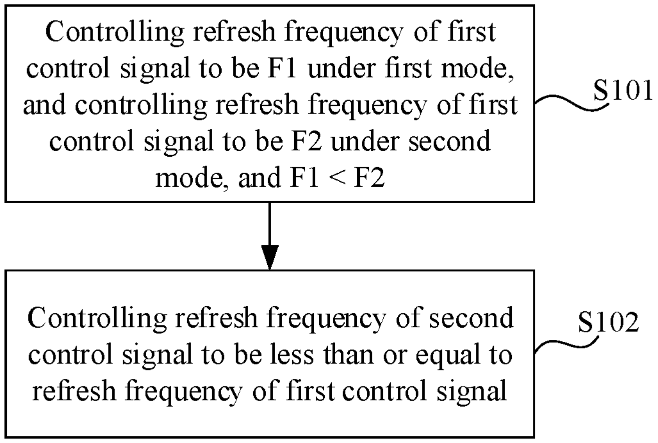
FIG. 26 shows yet another flow chart of a method for driving a display panel according to an embodiment of the present application.

As shown in FIG. 26, the method for driving the display panel may further include step S102.

At step S102, the refresh frequency of the second control signal is controlled to be less than or equal to the refresh frequency of the first control signal.

In the embodiments of the present application, the refresh frequency of the second control signal S2 is less than or equal to the refresh frequency of the first control signal S1. As such, in the same period of time, the times that the gate of the driving transistor T2 is refreshed by the data signal Vdata are fewer than or the same as the times that the light-emitting element 20 is reset, so that the it is avoided that the gate of the driving transistor T2 is refreshed by the data signal Vdata for many times, thereby reducing the power consumption to a certain extent.

Figure 27:
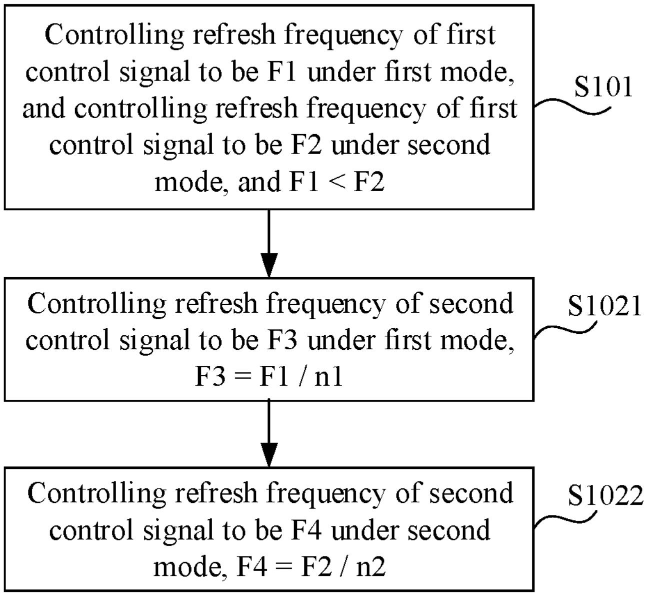
FIG. 27 shows yet another flow chart of a method for driving a display panel according to an embodiment of the present application.

In some optional embodiments, as shown in FIG. 27, step S102 may specifically include step S1021 and step S1022.

At step S1021, the refresh frequency of the second control signal is controlled to be F3 under the first mode, F3=F1/n1, and n1 is a natural number greater than or equal to F1/f.

At step S1022, the refresh frequency of the second control signal is controlled to be F4 under the second mode, F4=F2/n2, and n2 is a natural number greater than or equal to F2/f.

f is the maximum refresh frequency of the second control signal.

As such, the problem of flickering screen can be mitigated.

In some other optional embodiments, the operation modes of the display panel further includes a third mode, a brightness of the display panel is L3 under the third mode, and L2<L3.

Figure 28:
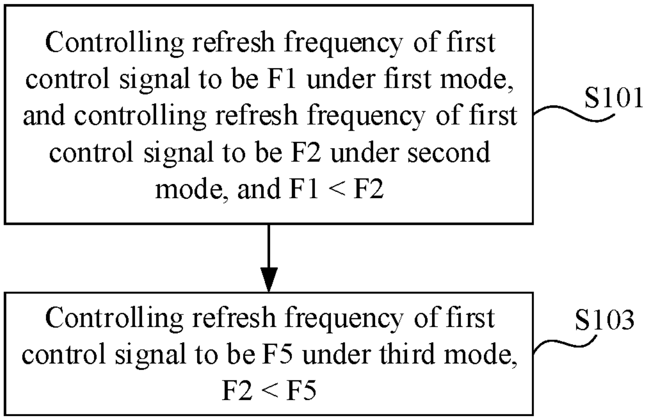
FIG. 28 shows yet another flow chart of a method for driving a display panel according to an embodiment of the present application.

As shown in FIG. 28, the method for driving the display panel further includes step S103.

At step S103, the refresh frequency of the first control signal is controlled to be F5 under the third mode, F2<F5; and L3−L2>L2−L1.

In this way, as the brightness of the display surface decreases in different operating modes, the refresh frequency of the first control signal also tends to decrease, when the refresh frequency of the first control signal is relatively high, the brightness range of the display panel to which the first control signal is applicable is relatively wide, and when the refresh frequency of the first control signal is relatively low, the brightness range of the display panel to which the first control signal is applicable is relatively narrow, so that the adjustment of the refresh frequency of the first control signal in the low brightness range is finer, and the problem of poor display uniformity of display panel in the low brightness mode is further mitigated.

Based on the same inventive concept, the embodiments of the present application further provide a driving circuit configured to provide a signal for the display panel according to the above embodiments. An operation mode of the display panel includes a first mode and a second mode, a brightness of the display panel is L1 under the first mode, the brightness of the display panel is L2 under the second mode, and L1<L2; the refresh frequency of the first control signal is F1 under the first mode, the refresh frequency of the first control signal is F2 under the second mode, and F1<F2.

It should be noted that, in the present embodiments, the first control signal received by the display panel is provided by the driving circuit, and features of the first control signal in any one of the previous embodiments can be provided by the driving circuit.

Based on the same inventive concept, the embodiments of the present application further provide a display device including the display panel according to the embodiments of the present application. Specifically, the display device includes a display panel including a pixel circuit and a light-emitting element, where the pixel circuit includes a first reset module configured to provide a reset signal for the light-emitting element under control of a first control signal; operation modes of the display panel include a first mode and a second mode, a brightness of the display panel is L1 under the first mode, the brightness of the display panel is L2 under the second mode, and L1<L2; a refresh frequency of the first control signal is F1 under the first mode, the refresh frequency of the first control signal is F2 under the second mode, and F1<F2. Therefore, the display device has the technical features of the display panel and the method for driving the display panel according to the embodiments of the present application, and can achieve beneficial effects of the display panel according to the embodiments of the present application, and for common features, reference can be made to the above description of the display panel according to the embodiments of the present application, which is not be repeated here.

Figure 29:
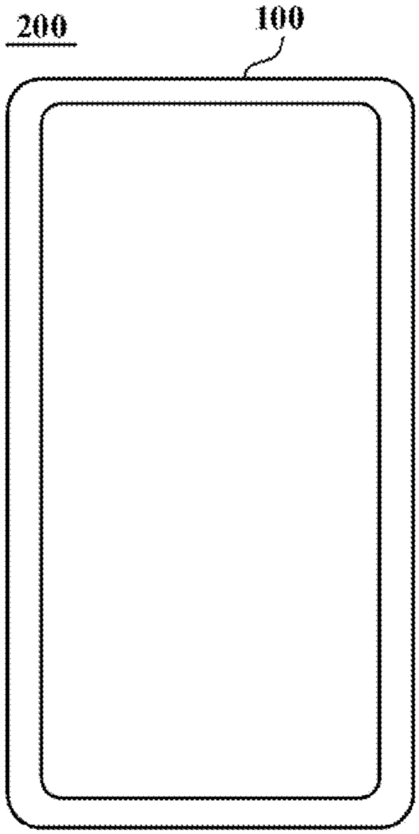
FIG. 29 shows a schematic structural diagram of a display device according to an embodiment of the present application.

In an example, FIG. 29 shows a schematic structural diagram of a display device provided according to an embodiment of the present application. As shown in FIG. 29, a display device 200 according to the embodiment of the present application includes a display panel 100 according to any one of the above embodiments of the present application. In the embodiment of FIG. 29, a mobile phone is only given as an example to illustrate the display device 200, and it can be understood that, the display device 200 provided by the embodiments of the present application can be any electronic product with a display function, which include but are not limited to following categories: a mobile phone, a television, a notebook computer, a desktop display, a tablet computer, a digital camera, a smart bracelet, smart glasses, a vehicle-mounted display, a medical device, an industrial control device, a touch interaction terminal and the like, which are not are not particularly limited by the embodiments of the present application.

According to the embodiments of present application described above, these embodiments do not describe all details thoroughly or do not limit the application to be the only specific embodiments. Obviously, many modifications and variations can be made according to the above description. These embodiments are selected and specifically described in this specification to better explain principles and practical application of the present application, so that a person skilled in the art is able to utilize well the present application and use the modifications based on the present application. The present application is limited only by claims and the full scope and equivalents of the claims.

What is claimed is:

1. A display panel comprising a pixel circuit and a light-emitting element, wherein the pixel circuit comprises a first reset module configured to provide a reset signal for the light-emitting element under control of a first control signal;

operation modes of the display panel comprise a first mode and a second mode, a brightness of the display panel is L1 under the first mode, the brightness of the display panel is L2 under the second mode, and L1<L2;

a refresh frequency of the first control signal is F1 under the first mode, the refresh frequency of the first control signal is F2 under the second mode, and F1<F2.

2. The display panel according to claim 1, wherein the pixel circuit further comprises a driving module and a bias adjustment module;

the driving module is configured to provide a drive current for the light-emitting element, and the driving module comprises a driving transistor;

the bias adjustment module is configured to provide a bias adjustment signal to a first terminal or a second terminal of the driving transistor under control of the first control signal.

3. The display panel according to claim 2, wherein in a duration of an image frame of the display panel, an operation process of the pixel circuit comprises a pre-light emission stage and a light emission stage;

wherein the pre-light emission stage of the pixel circuit comprises a reset stage in a duration of at least one image frame, and the first reset module is configured to provide the reset signal for the light-emitting element in the reset stage.

4. The display panel according to claim 3, wherein the pixel circuit further comprises a data writing module configured to selectively provide a data signal for the driving module;

one data writing cycle of the display panel comprises in total S frames of refreshed images comprising a data writing frame and a holding frame, and S>0;

the data writing frame comprises a data writing stage, and the data writing module is configured to write a data signal into a gate of the driving transistor in the data writing stage;

the holding frame does not comprise the data writing stage;

wherein at least the data writing frame comprises the reset stage.

5. The display panel according to claim 4, wherein at least the data writing frame further comprises an initialization stage, and the gate of the driving transistor is configured to receive an initialization signal for initialization in the initialization stage;

a duration of the reset stage is t1, and a duration of the initialization stage is t2;

wherein t1<t2.

6. The display panel according to claim 4, wherein at least one data writing frame further comprises M initialization stages, and the gate of the driving transistor is configured to receive an initialization signal for initialization in the initialization stage;

at least one data writing frame comprises N reset stages;

wherein N>M≥1, and N and M are integers.

7. The display panel according to claim 4, wherein at least one holding frame comprises the reset stage, and a duration of the reset stage in at least one holding frame is greater than a duration of the reset stage in the data writing frame.

8. The display panel according to claim 2, wherein the pixel circuit further comprises a data writing module and a threshold compensating module, the data writing module is configured to transmit a data signal, and the threshold compensating module is configured to write the data signal into the driving module and compensate a threshold voltage of the driving module under control of a second control signal;

a refresh frequency of the second control signal is less than or equal to a refresh frequency of the first control signal.

9. The display panel according to claim 8, wherein the refresh frequency of the second control signal is F3 under the first mode, F3=F1/n1, and n1 is a natural number greater than or equal to F1/f;

the refresh frequency of the second control signal is F4 under the second mode, F4=F2/n2, and n2 is a natural number greater than or equal to F2/f;

wherein f is a maximum refresh frequency of the second control signal.

10. The display panel according to claim 1, wherein the pixel circuit further comprises a driving module and a bias adjustment module;

the driving module is configured to provide a drive current for the light-emitting element, and the driving module comprises a driving transistor;

the bias adjustment module is configured to provide a bias adjustment signal for a first terminal or a second terminal of the driving transistor under control of a third control signal;

the third control signal and the first control signal are different control signals.

11. The display panel according to claim 10, wherein under the first mode or the second mode, the refresh frequency of the first control signal is greater than or equal to a refresh frequency of the third control signal.

12. The display panel according to claim 10, wherein under the first mode, the refresh frequency of the first control signal is less than a refresh frequency of the third control signal;

under the second mode, the refresh frequency of the first control signal is equal to the refresh frequency of the third control signal.

13. The display panel according to claim 1, wherein the operation modes of the display panel further comprise a third mode, the brightness of the display panel is L3 under the third mode, and L2<L3;

the refresh frequency of the first control signal is F5 under the third mode, and F2<F5;

L3−L2>L2−L1.

14. The display panel according to claim 1, wherein the brightness of the display panel comprises a first brightness range and a second brightness range, and a brightness value in the first brightness range is less than a brightness value in the second brightness range;

the refresh frequency of the first control signal is of a same value in the first brightness range, the refresh frequency of the first control signal is of a same value in the second brightness range, and the refresh frequency of the first control signal in the first brightness range is not equal to the refresh frequency of the first control signal in the second brightness range.

15. The display panel according to claim 1, wherein a display area of the display panel comprises a first sub-display region and a second sub-display region;

under the first mode or the second mode, the refresh frequency of the first control signal is of a same value at the first sub-display region, the refresh frequency of the first control signal is of a same value at the second sub-display region, and the refresh frequency of the first control signal at the first sub-display region is not equal to the refresh frequency of the first control signal at the second sub-display region.

16. The display panel according to claim 15, wherein the display area of the display panel comprises a first edge and a second edge opposite to each other along a first direction, a non-display area of the display panel comprises a bonding area, and the second edge is positioned on a side of the first edge away from the bonding area;

along the first direction, the first sub-display region is positioned on a side of the second sub-display region away from the first edge;

the refresh frequency of the first control signal is F6 at the first sub-display region, the refresh frequency of the first control signal is F7 at the second sub-display region, and F6<F7.

17. The display panel according to claim 1, wherein under the first mode, a refresh cycle of the first control signal is a first refresh cycle, and in the first refresh cycle, a duration for which the first control signal is at an ON-level is t4;

under the second mode, the refresh cycle of the first control signal is a second refresh cycle, in the second refresh cycle, the duration for which the first control signal is at an ON-level is t5, and t4=t5.

18. The display panel according to claim 1, wherein the pixel circuit further comprises a light emission controlling module configured to cause the light-emitting element to enter a light emission stage under control of a fifth control signal, and the refresh frequency of the first control signal is less than or equal to a refresh frequency of the fifth control signal.

19. The display panel according to claim 1, wherein one data writing cycle of the display panel comprises in total S frames of refreshed images comprising a data writing frame and a holding frame, and S>0;

a duration of at least one holding frame is equal to an inverse of the refresh frequency of the first control signal.

20. A display device, comprising a display panel comprising a pixel circuit and a light-emitting element, wherein the pixel circuit comprises a first reset module configured to provide a reset signal for the light-emitting element under control of a first control signal;

operation modes of the display panel comprise a first mode and a second mode, a brightness of the display panel is L1 under the first mode, the brightness of the display panel is L2 under the second mode, and $L1<L2$;

a refresh frequency of the first control signal is F1 under the first mode, the refresh frequency of the first control signal is F2 under the second mode, and $F1<F2$.

* * * * *